US010291674B1

(12) United States Patent
Pierson

(10) Patent No.: US 10,291,674 B1
(45) Date of Patent: May 14, 2019

(54) CLOUDBOARD NEWS

(71) Applicant: CloudBoard, LLC, Lincoln, MA (US)

(72) Inventor: Mark Pierson, Lincoln, MA (US)

(73) Assignee: CloudBoard, LLC, Lincoln, MA (US)

( * ) Notice: Subject to any disclaimer, the term of this patent is extended or adjusted under 35 U.S.C. 154(b) by 317 days.

(21) Appl. No.: 14/939,386

(22) Filed: Nov. 12, 2015

Related U.S. Application Data

(60) Provisional application No. 62/086,123, filed on Dec. 1, 2014.

(51) Int. Cl.
*H04L 29/06* (2006.01)
*H04L 29/08* (2006.01)

(52) U.S. Cl.
CPC .............. *H04L 65/60* (2013.01); *H04L 67/06* (2013.01); *H04L 67/1097* (2013.01)

(58) Field of Classification Search
CPC ...... H04L 65/60; H04L 67/06; H04L 67/1097
See application file for complete search history.

(56) References Cited

U.S. PATENT DOCUMENTS

| | | | | |
|---|---|---|---|---|
| 8,667,160 B1* | 3/2014 | Haot | ............. | H04N 21/6175 709/203 |
| 9,426,543 B1* | 8/2016 | Li | ............. | H04N 21/8586 |
| 2008/0155627 A1* | 6/2008 | O'Connor | ............. | H04N 7/173 725/109 |
| 2009/0099919 A1* | 4/2009 | Schultheiss | ............. | G06Q 10/00 705/14.1 |
| 2012/0110141 A1* | 5/2012 | Biderman | ............. | H04N 7/17318 709/219 |
| 2015/0007030 A1* | 1/2015 | Noy | ............. | G06F 3/0482 715/719 |
| 2015/0100984 A1* | 4/2015 | Hsiung | ............. | H04N 21/4825 725/39 |
| 2015/0186744 A1* | 7/2015 | Nguyen | ............. | H04N 19/186 382/190 |
| 2015/0318020 A1* | 11/2015 | Pribula | ............. | H04N 21/43615 386/227 |

(Continued)

OTHER PUBLICATIONS

Mohapatra, Shivajit, et al., "Energy-Aware Adaptations for End-To-End Video Streaming to Mobile Handheld Mobile Devices," Sep. 2006, pp. 1-21, Retrieved from the Internet URL: http://www.ics.uci.edu/~dsm/dyn/pub/bookchapter.pdf.

(Continued)

*Primary Examiner* — Jerry B Dennison
(74) *Attorney, Agent, or Firm* — Hamilton, Brook, Smith & Reynolds, P.C.

(57) ABSTRACT

A method, corresponding system, and corresponding apparatus distribute user generated content from a computing device to one or more display devices. The computer-implemented method may begin by communicatively coupling the computing device, a server, and the one or more display devices. The computing device executes a user interface. The user interface may include a field for accepting user generated content. The server may store the user generated content, in a manner enabling assembling of the user generated content. The server communicates the assembled user generated content to selected display devices. The display devices display the assembled user generated content in a sequence defined by a playlist.

19 Claims, 13 Drawing Sheets

(56) References Cited

U.S. PATENT DOCUMENTS

2016/0147890 A1* 5/2016 Wissner ............ G06F 17/30867
707/727

OTHER PUBLICATIONS

Hsu, C.-F., et al., "Screencast in the Wild: Performance and Limitations," Nov. 2014, pp. 1-4, Retrieved from the Internet URL: http://mmnet.iis.sinica.edu.tw/pub/hsu14_screencast.pdf.

Bentley, F., et al., "MyChannel: Exploring City-Based Multimedia News Presentations on the Living Room TV," Yahoo Labs, Jun. 2014, pp. 1-8, Retrieved from the Internet URL: http://web.mit.edu/bentley/www/papers/myChannel-cameraready.pdf.

Chesnais, P.R., et al., "Fishwrap Personalized News System," Proceedings of the Second International Workshop on Integrated Multimedia Services to the Home, Jun. 1995, 10.1109/CN.1995.509583, IEEE.

Russell, A., "Adrienne Russell: Networked: A Contemporary History of News in Transition," Jul. 2011, Polity Press, (table of contents included only).

Kolb, J., and Reichert, M., "Supporting Business and It through Updatable Process Views: The proView Demonstrator," Service-Oriented Computing—ICSOC 2012 Workshops, Nov. 2012, pp. 1-5, Retrieved from the Internet URL: http://dbis.eprints.uni-ulm.de/866/1/Kolb_ICSOC_Demo_2012.pdf.

Veselinovska, B., et al., "State of the Art in IPTV," May 2014, 37th International Convention on Information and Communication Technology, Electronics and Microelectronics (MIPRO).

* cited by examiner

CLOUDBOARD NEWS

RELATED APPLICATION

This application claims the benefit of U.S. Provisional Application No. 62/086,123, filed on Dec. 1, 2014. The entire teachings of the above application is incorporated herein by reference.

BACKGROUND OF THE INVENTION

Organizations today face a number of existing challenges directly related to how organizations communicate both internally and externally. Such challenges may prevent organizations from adequately coordinating collective activities and effectively aligning resources to achieve strategic objectives. Such challenges may stem from one or more deficiencies, such as: (1) too many communications technologies being available and deployed that tend to overlap, diffuse and dilute "key" messages; (2) a lack of a way to make key messages more "visible" within the organization; and (3) an inability to be able to quickly create, prioritize, and elevate key messages, and distribute the messages to the proper place in the organization.

SUMMARY OF THE INVENTION

Thus, an efficient and reliable method, corresponding system, and corresponding apparatus is presented, which overcomes the existing challenges and deficiencies with respect to communication within organizations. Some embodiments may include a new category, known as a "group" communication solution. According to some embodiments, the group communication solution may combine simple, yet sophisticated, streaming broadcast capabilities, with mobile content capture and management applications, to deliver professional looking strategic messages, and/or other mixed-media content, throughout enterprises and organizations of all sizes.

Some embodiments of the present disclosure may utilize computing devices (including but not limited to desktop computers, laptop computers, mobile computing devices, smartphones, tablets, among others) for the submission of user generated content (including but not limited to messages, text, images, graphics, video, audio, and/or other user generated content). Some embodiments may review and select the submitted user generated content for display on display devices. According to some embodiments, the display devices may be located anywhere inside and/or outside the organization to display and communicate the approved user generated content. Therefore, organizations may streamline communication, and quickly create, evaluate, prioritize, and communicate key messages in desired locations anywhere in the organization.

As such, the present disclosure is directed to a method, corresponding system, and corresponding apparatus for distributing user generated content from a computing device to one or more display devices. In some embodiments, a computer-implemented method may begin by communicatively coupling the computing device, a server, and the one or more display devices. Some embodiments may execute a user interface on the computing device. In some embodiments, the user interface may include an input or other field for accepting (receiving) user generated content. In some embodiments, the server may store the user generated content, in a manner enabling assembling of the user generated content. In some embodiments, the assembled user generated content (that is, the resulting assembly of various received and stored user generated content) may include at least one playlist comprising portions of the input user generated content. Some embodiments may select at least one of the one or more display devices. Some embodiments may communicate the assembled user generated content including the at least one playlist to the selected at least one of the one or more display devices. In some embodiments, the assembled user generated content may include at least one playlist, each playlist defining a respective sequence of user generated content. Some embodiments may display the assembled user generated content on the selected at least one of the one or more display devices in a sequence or order defined by the at least one playlist.

Some embodiments may initialize the one or more display devices. In some embodiments, the initialization may be based upon a respective unique identifier for and/or associated with each of the one or more display devices. In some embodiments, the server may store one or more of the respective unique identifiers. In some embodiments, the computing device may perform the initialization.

Some embodiments may associate the at least one of the one or more display devices and the assembled user generated content (including but not limited to the at least one playlist) with at least one location on the server. Generated content may include, but is not limited to a playlist. A playlist may include, but is not limited to a news stream, portions of user generated content, and/or one or more articles of information. One or more articles of information may include but are not limited to text, audio, graphical images, video, and/or other types of information (including but not limited to control or data information which is transmitted and/or received).

In some embodiments, the server may transmit a first stream of the assembled user generated content (including but not limited to the at least one playlist) from the server to the at least one of the one or more display devices. In some embodiments, the server may update the assembled user generated content (including but not limited to the at least one playlist). In some embodiments, the server may transmit the updated stream of assembled user generated content to the at least one of the one or more display devices, while the transmission of the first stream is preserved.

Some embodiments may perform the assembling of the user generated content at the server. Some embodiments may perform the assembling of the user generated content at the one or more display devices.

In some embodiments, each of the one or more display devices may be located at a remote location. In some embodiments, the computing device (for input or receipt of user generated content) may be mobile.

The server or method therein by some embodiments may convert the assembled user generated content (including but not limited to the at least one playlist) into a video file. Some embodiments may encode, by the server for example, the video file. Some embodiments may stream the video file from the server to the at least one of the one or more display devices. In some embodiments, the at least one of the one or more display devices may decode the encoded video file received from the server.

The server or corresponding process (method) in some embodiments may organize the user generated content into a plurality of channels (including but not limited to communication, electronic, digital, analog, and/or other types of channels) and may select at least one of the one or more channels to display on the at least one of the one or more display devices. Some embodiments may filter the user generated content within one or more of the plurality of channels.

Some embodiments may distribute user generated content from one or more computing devices to a display device. Some embodiments may begin by communicatively coupling one or more computing devices, a server, and a display device. Some embodiments may execute a user interface on the one or more computing devices. In some embodiments, the user interface may include a field for accepting user generated content. Some embodiments may accept various (multiple and different amounts of) user generated content from a plurality of users. In some embodiments, the server may store the user generated content. Some embodiments may create, at the server end, one or more channels (including but not limited to communication, electronic, digital, analog, and/or other types of channels) by filtering the user generated content and compiling the filtered user generated content into the one or more channels. Some embodiments may communicate the one or more channels from the server to the display device. Some embodiments may select at least one of the channels to display on the display device. Some embodiments may display at least one of the channels on the display device. Some embodiments may modify the user generated content while preserving communication of the one or more channels from the server to the display device.

Some embodiments may store the assembled user generated content in one or more locations at the server. In some embodiments, the server may modify the assembled user generated content stored in the one or more locations at the server. Some embodiments may preserve streaming communication of the assembled user generated content between the server and one or more display devices.

Some embodiments may include a system for distributing content. Such a system for distributing content may include a computing device, a server, one or more display devices, and an assembly engine. Some embodiments of the system for distributing content may include a network configured to communicatively couple the computing device, the server, the one or more display devices, and the assembly engine. In some embodiments, the computing device may be configured to execute a user interface. In some embodiments the user interface may include a field for accepting user generated content as input by a user. In some embodiments the server may be configured to store the input user generated content, in a manner enabling assembling of the user generated content. In some embodiments, the assembly engine may be configured to assemble the stored user generated content or form assemblies of user generated content. In some embodiments, the assembled user generated content may include at least one playlist comprising one or more portions of the user generated content (formed assemblies thereof). In some embodiments, the assembly engine may be further configured to communicate the assembled user generated content (which may include the at least one playlist) from the server to the one or more display devices. In some embodiments, the one or more display devices may be configured to display the assembled user generated content in a sequence defined by the at least one playlist, on at least one of the one or more display devices.

In some embodiments of the system for distributing content, the one or more display devices may be further configured to assemble the user generated content including the at least one playlist.

In some embodiments of the system for distributing content, the assembly engine may be further configured to convert the assembled user generated content into a video file, encode the video file, and stream the encoded video file to the one or more display devices. In some embodiments of the system for distributing content, the one or more display devices may be further configured to decode the received encoded video file.

In some embodiments of the system for distributing content, the assembly engine may be further configured to organize the user generated content into a plurality of channels (including but not limited to communication, electronic, digital, analog, and/or other types of channels) and select one or more channels to display on the one or more display devices. In some embodiments of the system for distributing content, the assembly engine may be further configured to filter the user generated content of one or more of the plurality channels.

In some embodiments of the system for distributing content, the server may be further configured to initialize the one or more display devices, each of the one or more display devices may have a respective unique identifier. Some embodiments may perform the initialization based upon the respective identifier.

In some embodiments of the system for distributing content, the server may be further configured to store the assembled user generated content in one or more locations. In some embodiments, the server may modify the assembled user generated content stored in the one or more locations while preserving streaming communication of the assembled user generated content between the server and the one or more display devices.

Some embodiments are directed to a non-transitory computer readable medium having stored thereon a sequence of instructions which, when loaded and executed by a processor coupled to an apparatus, may cause the apparatus to: communicate with a computing device, a server, and one or more display devices; execute a user interface on the computing device, the user interface including a field for accepting (receiving) user generated content; accept user generated content; store received/input user generated content on a server; assemble the stored user generated content in a predetermined manner; select any number of display devices from one or more display devices; and display the assembled (assemblies of) user generated content on the selected one or more display devices.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Although various tools to communicate both internally and externally in an organization exist, organizations still lack the ability to broadly communicate key organizational messages in a manner that aligns employees to achieve the organization's strategic objectives. Further, organizations require a way to make communication more focused to make important messages relatively more visible. When organizations utilize too many communication technologies, the information shared may overlap and important messages may become diluted. Additionally, many existing communication technologies lack central editorial control, which may lead to inaccurate or inappropriate messages being disseminated throughout an organization.

Thus, some embodiments include a new category of "group" communication solution that combines simple, yet sophisticated, streaming broadcast capabilities with mobile content capture and management applications to deliver professional looking strategic messages, and/or other mixed-media content to (and throughout) enterprises and organizations of varying sizes. According to some embodiments, members of an organization may utilize computing devices to submit user generated content for display on display devices located anywhere an internet connection is available. In some embodiments, one or more computing devices, a server, and one or more display devices may be communicatively coupled to a local area network, in which case members of an organization may utilize the one or more computing devices to submit user generated content for display on the one or more display devices located on the local area network. In some embodiments, users with editorial control (i.e., editors) may review user generated content to prevent inaccurate and/or in appropriate content from displaying on display devices. Further, in some embodiments a server may reorganize user generated content arranged in a micro-template (i.e., a small template for accepting user generated content on a mobile computing device) into a display template for display on one or more display devices. Some embodiments may automatically assemble (i.e., organize, arrange, etc.) user generated content into a display template, which enables the user to quickly present user generated content in a visually appealing and professional manner.

Figure 1:
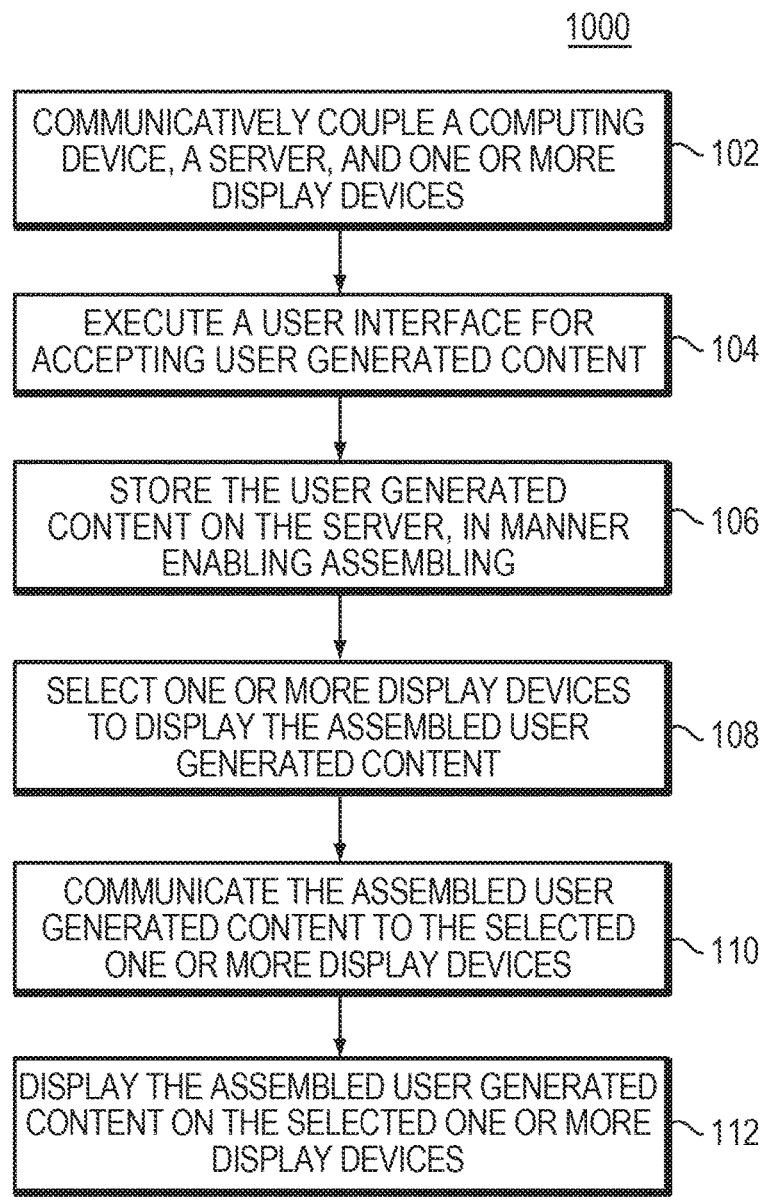
FIG. 1 illustrates a high-level flowchart of steps of a method and system, according to some embodiments.

Thus, as illustrated in FIG. 1, an efficient and reliable method (and system) 1000 for distributing user generated content is presented. Some embodiments are directed to a method, corresponding system, and corresponding apparatus for distributing user generated content from a computing device to one or more display devices. Some embodiments may begin by communicatively coupling 102 the computing device, a server, and the one or more display devices. Next, the computing device may execute 104 a user interface, which may include a field for accepting user generated content. Next, the server may store 106 the user generated content, in a manner enabling assembling of the user generated content. In some embodiments, the assembled user generated content may include at least one playlist comprising portions of the user generated content sequenced in a certain order. Next, in some embodiments, the method (and system) 1000 may select 108 at least one of the one or more display devices to display the assembled user generated content. Next, in some embodiments, the method (and system) 1000 may communicate 110 the assembled user generated content, including the at least one playlist, to the selected at least one of the one or more display devices. Finally, in some embodiments, the method (and system) 1000 may display 112 the assembled user generated content on the selected at least one of the one or more display devices in a sequence defined by the at least one playlist. Note, in some embodiments, the steps of the method 1000 may be configured as one or more components of a computer system or processor.

As illustrated in FIG. 1, in step 102, in some embodiments, a computing device, a server, and one or more display devices may be communicatively coupled over a single network and/or a combination of networks. The types of networks that may be used are not limited, but may include a remote access network, a global network (e.g., the Internet), a worldwide collection of computers, local area or wide area networks, gateways that currently use respective protocols (TCP/IP, BLUETOOTH™, etc.) to communicate with one another, and/or other suitable network architectures. Refer to the description of FIG. 12 below for more details about communicatively coupling the computing device, the server, and the one or more display devices, according to some embodiments.

Continuing with FIG. 1, in step 104, some embodiments may execute a user interface for receiving and accepting user generated content. In some embodiments, users may directly insert or otherwise input user generated content (i.e., text, images, audio, and/or video and the like) into the user interface. In some embodiments, users may upload content from outside sources (e.g., webpages, email, social media posts, local storage, cloud storage, common message communication sources, etc.). In step 104, in some embodiments, a computing device may execute a user interface that may accept user generated content and may communicate the received (input) user generated content to a server.

In step 106, the method (and system) 1000 may store user generated content on a server, in a manner enabling assembly of user generated content. In some embodiments, a server in response to the computing device may accept user generated content, validate, and store the user generated content. In some embodiments, the server may assemble and convert user generated content into a suitable format for display on one or more display devices. In some embodiments the assembling may include, but is not limited to the server reformatting, mixing, and repurposing the user generated content. In some embodiments, the server may assemble user generated content by extracting the user generated content from a micro-template used by the server interface of the computing device and reorganizing the extracted user generated content into a display template. In some embodiments, the server may assemble user generated content into one or more playlists. In some embodiments, the playlists may comprise one or more portions of user generated content organized into one or more display templates. The display templates may be sequenced in a certain order per playlist. In other embodiments, a playlist may be created by the server by assembling user generated content from one or more users into an ordered sequence, which some embodiments may play as a video on one or more display devices.

Referring to FIG. 1, in step 108, the method (and system) 1000 may select one or more display devices to display the assembled user generated content, i.e. the resulting assemblies of step 106. In some embodiments, a user may select one or more display devices to display accepted and assembled user generated content from a computing device. In some embodiments, an owner of one or more display devices may select certain ones of the one or more display devices to display user generated content.

In step 110, the method (and system) 1000 may communicate assembled user generated content from the server to one or more display devices. In some embodiments, the assembled user generated content includes at least one playlist. In some embodiments, the server may stage assembled user generated content for transmission, and at an appropriate time, may deliver assembled user generated content to the one or more selected display devices.

In step 112, the method (and system) 1000 may display assembled user generated content on the one or more display devices. In some embodiments, the one or more display devices may display assembled user generated content in a sequence defined by at least one playlist. In some embodiments, one or more display devices may receive assembled user generated content from the server and may display the assembled user generated content at the one or more display devices' locations.

Figure 2:
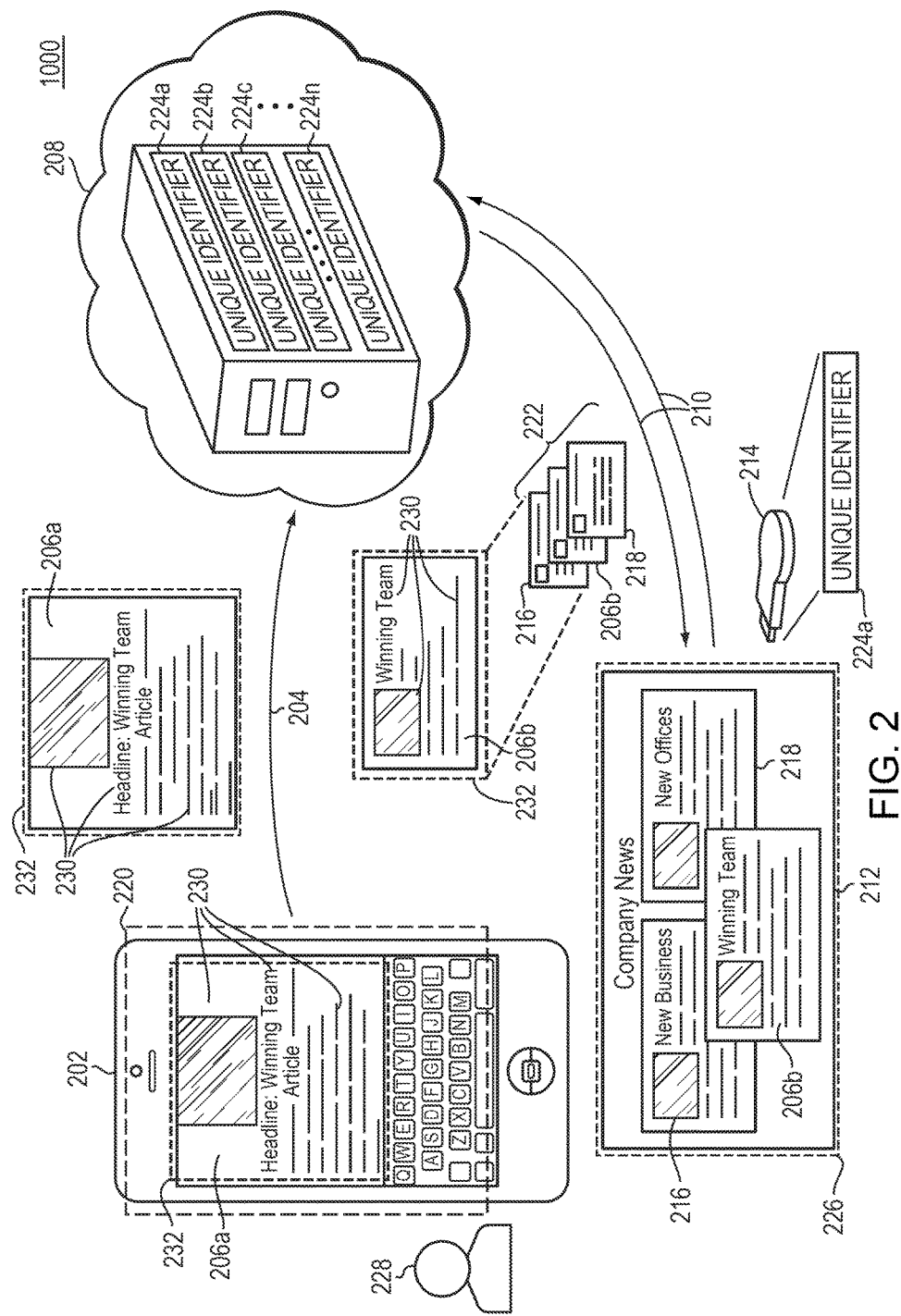
FIG. 2 illustrates a flow diagram of the method and system, according to some embodiments.

FIG. 2 illustrates a flow diagram of method (and system) 1000, including a computing device 202, a server 208, and a display device 212, according to some embodiments. In some embodiments, a user 228 may execute an application (i.e., a computer application) with a user interface 220 on a computing device 202 (including but not limited to desktop computers, laptop computers, mobile computing devices, smartphones, tablets, among others). In some embodiments, a user 228 may capture, select and/or enter user generated content 230 (i.e., combinations of images, text, and/or videos, etc.) into the user interface 220 of the application.

According to some embodiments, the computing device 202 may be a mobile computing device (e.g., smartphone, tablet, laptop, etc.). In some embodiments, a computing device 202 may include one or more applications for creating and controlling user generated content 230 to be delivered to a display device 212 via a server 208. In some embodiments, an application may be implemented in X-Code, (i.e., which includes but is not limited to an integrated development environment (IDE) including a suite of software development tools developed by Apple for developing software for OS X and/or iOS) and may communicate with a server 208 (e.g., a Cloud-based service) using standard communications protocols (TCP/IP, HTML5, and others). According to some embodiments, a user 228 may create an article 232 of user generated content 230 by entering user generated content 230 into a micro-template 206a. In some embodiments, an article 232 may be comprised of a collection of related user generated content 230. In some embodiments, the related user generated content 230 may comprise an article 232 which may include any combination of text, images, audio, video, and/or any other type of media.

In some embodiments, a micro-template 206a may be a small template with an input area pre-configured for the type of article 232 being created. According to some embodiments, a micro-template 206a may be filled with user generated content 230 which may include any combination of text, images, audio, video, and/or any other type of media. In some embodiments, a user 228 may create an article 232 by compiling one or more forms of user generated content 230 into a micro-template 206a. In some embodiments, a user 228 may create a new article 232 by selecting a new article button on an application's user interface 220 and entering user generated content 230 into a micro-template 206a. According to some embodiments, a user 228 may take a picture with a computing device's 202 camera and/or select an image to include in the article 232. In some embodiments, a user 228 may enter a headline and/or text, and/or may set a play duration for how long the article 232 displays on the display device 212.

Referring to FIG. 2, the computing device 202 transmits or otherwise transfers an article 232 which may include one or more micro-templates 206a, holding the user generated content 230, over a communication network 204 (including but not limited to a local network, a remote network, a cell data network, a wireless network, or the Internet, among others) to a server 208 (e.g., a Cloud-based service). According to some embodiments, a server 208 (e.g., a Cloud-based service) may be comprised of one or more servers, routers, databases, network devices and/or various application software. In some embodiments, a server 208 (e.g., a Cloud-based service) may receive an article 232 which may include the form of a micro-template 206a holding user generated content 230. In some embodiments, a server 208 (e.g., a Cloud-based service) may store the received article 232 which may include the form of a micro-template 206a. In some embodiments, a server 208 (e.g., a Cloud-based service) may assemble user generated content 230 by extracting the user generated content 230 from a micro-template 206a and reorganizing the extracted user generated content 230 into a display template 206b designed for display on one or more display devices 212. In some embodiments, a server 208 (e.g., a Cloud-based service) may assemble one or more of the display templates 216, 206b, 218 into a playlist 222 ordering or sequencing one or more articles 232. In some embodiments, the display template 206b may organize the related user generated content 230, which comprises the article 232. The server 208 may transmit the playlist 222 to the one or more display devices 212.

Referring to FIG. 2, in some embodiments, the server 208 may transfer a display template 206b over a communication network 210 (e.g., cell data network, wireless network, or the Internet, among others) to one or more display devices 212. In some embodiments, one or more display devices 212 may include a television monitor with a media streaming device 214 (i.e., a media receiver, and/or wireless media receiving stick, including but not limited to a CHROMECAST stick) connected via the television monitor's HDMI port for nonlimiting example. According to some embodiments, one or more display devices 212 may include a smart television, which preferably does not require a separate media streaming device 214.

In some embodiments, the method (and system) 1000 may initialize one or more display devices 212 based upon a unique identifier 224 (collectively, 224a, 224b, 224c, . . . 224n of FIG. 2) for each display device 212. In some embodiments, one or more servers 208 may receive communication of the unique identifier 224a over the network 210 from the one or more display devices 212. In response, server 208 uses the received unique identifier 224a in a look up table or the like to find stored memory matching unique identifiers 224a, 224b, 224c . . . 224n for the one or more display devices 212. Upon a successful look up or match, server 208 initializes the respective display devices 212. In some embodiments, the computing device 202 may perform the initialization by capturing one or more display devices' 212 unique identifier 224a. In some embodiments, the server 208 (e.g., a Cloud-based service) may determine to which of the one or more display devices 212 or the computing device 202 to deliver the user generated content 230 through the use of the unique identifiers 224 (collectively, 224a, 224b, 224c, . . . 224n of FIG. 2). As such, some embodiments eliminate the need for a user 228 to take independent actions at the one or more display devices 212, in order to begin communicating user generated content 230 from the server 208 to the one or more display devices 212.

Referring to FIG. 2, in some embodiments, a display template 206b may be combined with existing display templates 216 and 218, which a server 208 (e.g., a Cloud-based service) may currently be communicating to the selected one or more display devices 212. In some embodiments, one or more display devices 212 may display the new user generated content 230 in a display template 206b, along with other existing user generated content in display templates 216 and 218. In some embodiments, one or more display devices 212 may display the playlist 222 comprised of multiple articles 232 of the user generated content 230 organized in display templates 206b, 216, and 218. According to some embodiments, the playlist 222 may be a professionally formatted dynamic visual, which may cycle through articles 232 in an interesting way such that the final presentation plays as a video. The playlist 222 defines the sequence or order of display of the unlimited articles 232 (or user generated content 230 generally speaking).

Further, in some embodiments, a computer-implemented method may begin by communicatively coupling a computing device 202, a server 208, and one or more display devices 212. In some embodiments, the computing device 202 may execute a user interface 220. In some embodiments, the user interface 220 may include a field 206a for accepting user generated content 230 as input by the user 228. In some embodiments, the computing device 202 communicates the input user generated content 230 to server 208. In turn, the server 208 may store the received user generated content 230, in a manner enabling assembling of the user generated content. In some embodiments, server 208 arranges amounts of stored user generated content 230 into display templates 216, 206b, 218. In embodiments, the display templates 216, 206b, 218 or assembled user generated content 230 are used to form a playlist 222 that sequences the user generated content 230 or portions thereof. In some embodiments, users may select at least one of the one or more display devices 212 to display the assembled user generated content in display templates 216, 206b, 218. In some embodiments, the server 208 may communicate the assembled user generated content 230/ display templates 216, 206b, 218 to the selected at least one of the one or more display devices 212. In some embodiments, the assembled user generated content 230/display templates 216, 206b, 218 may include the at least one playlist 222. In some embodiments, one or more display devices may display the assembled user generated content 230/display templates 216, 206b, 218 on the selected at least one of the one or more display devices 212 in a sequence defined by the at least one playlist 222.

In some embodiments, the method (and system) 1000 may assemble the user generated content 230 at the server 208. In some embodiments, the user generated content 230 may be assembled at the one or more display devices 212. In some embodiments, each of the one or more display devices 212 may be located at a remote location 226. In some embodiments, the computing device 202 may be mobile.

Figure 3:
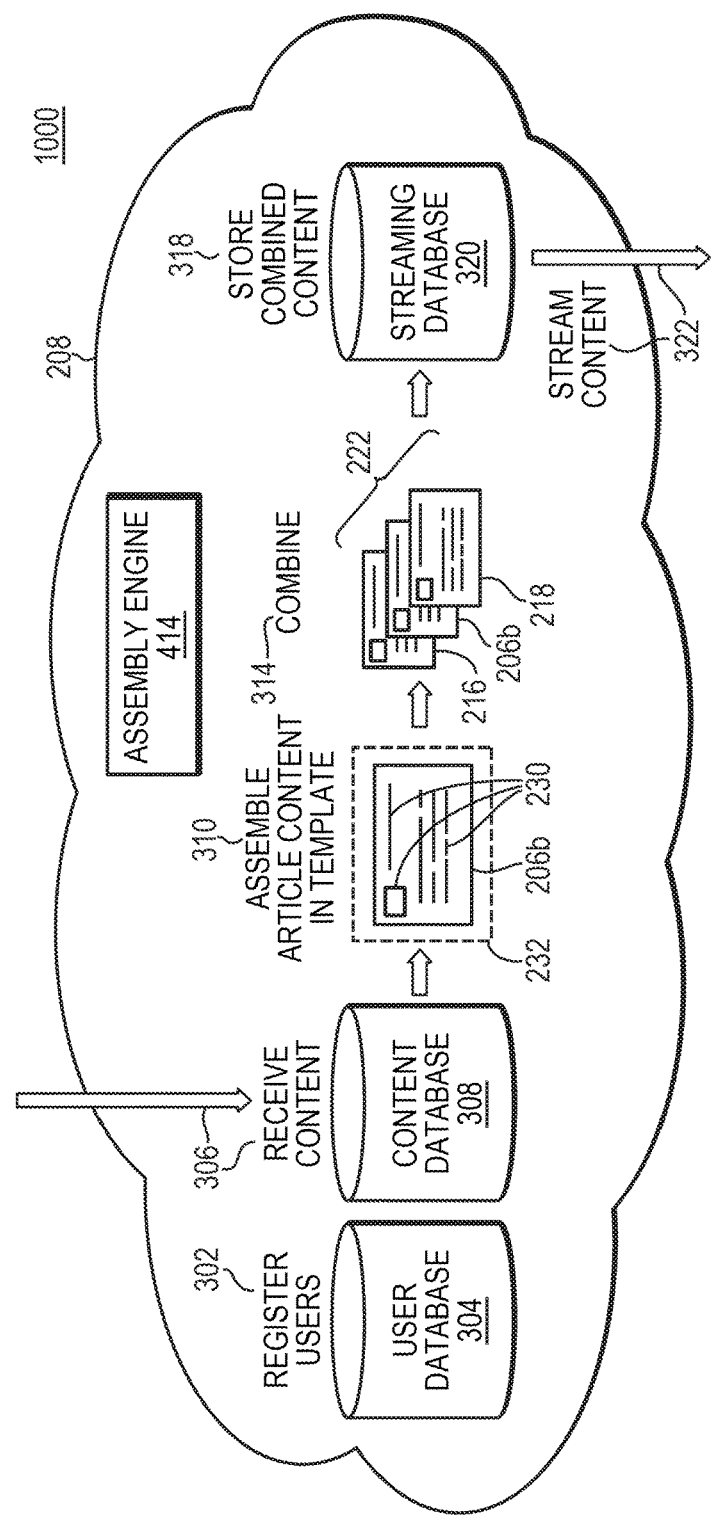
FIG. 3 illustrates a flow diagram of the data handling by a server, according to some embodiments.

FIG. 3 illustrates a flow diagram of the data handling and the movement of data through a server 208 (e.g., a Cloud-based service), according to some embodiments. In some embodiments, the components of a server 208 (e.g., a Cloud-based service) may reside on an internal computer network attached to, and communicating with the Internet. According to some embodiments, major components of a server 208 (e.g., a Cloud-based service) may include a variety of computer servers configured to run on and communicate with a computer communications network, network software, data storage devices, and/or database, security, and/or application software. In some embodiments, networked components may work together to operate the server 208 (e.g., a Cloud-based service), and store and assemble the data which may be produced by the internal processes of the method 1000. As illustrated in FIG. 3, a server 208 (e.g., a Cloud-based service) may receive 306 user generated content. In some embodiments, user generated content 230 may be in the form of an article 232, organized in a micro-template 206b. In some embodiments, the server 208 (e.g., a Cloud-based service) may validate the user generated content with a list of pre-registered or registered users 302, which may be stored in a user database 304. In some embodiments, the user database 304 may include basic information identifying one or more users. In some embodiments, the server 208 (e.g., a Cloud-based service) and/or a computing device 202 may enter the user generated content 230 into a content database 308, in an area specifically dedicated to a submitting user.

According to some embodiments, the server 208 (e.g., a Cloud-based service) may assemble 310 the user generated content 230 into the display template 206b. In some embodiments, a user, who oversees the display template's 206b behavior, may select attributes of the display template 206b. In some embodiments, the server 208 (e.g., a Cloud-based service) may include an assembly engine 414. In some embodiments, an assembly engine 414 may obtain an article 232, having of user generated content 230 (i.e., text, images, audio, and/or videos) in a micro-template, and may extract the user generated content 230 from the micro template. Next, the assembly engine 414 assembles the extracted user generated content 230 by organizing the user generated content 230 into the display template 206b (i.e., templates designed for displaying content on the display devices). In some embodiments, the server 208 (e.g., a Cloud-based service) may make adjustments to the display template 206b and user generated content 230 in the display template 206b, in order to fit the screen of one or more selected display devices. In some embodiments, a server 208 (e.g., a Cloud-based service) may confirm that the user generated content 230 is in a format that is supported by the one or more display devices. In some embodiments, the server 208 (e.g., a Cloud-based service) may convert the user generated content 230 into a supported format, which may include, converting from one type of video codec to another.

As illustrated in FIG. 3, in some embodiments, a server 208 (e.g., a Cloud-based service) may create a playlist 222 by combining 314 the display template 206b with one or more other assembled display templates 216 and 218 (although two display templates are shown, embodiments are not so limited). In some embodiments, the server 208 (e.g., a Cloud-based service) may utilize preference information from a user while combining 314 display templates 206b, 216, and 218. The preference information may include instructions of how the user generated content 230 may be displayed, arranged, formatted, and/or ordered (on display device 212 of FIG. 2). Referring back to FIG. 3, in some embodiments, the server 208 (e.g., a Cloud-based service) may combine 314 the display template 206b into an existing or new playlist 222. In some embodiments, the server 208 (e.g., a Cloud-based service) may store 318 the playlist 222 in a streaming database 320. In some embodiments, the server 208 (e.g., a Cloud-based service) may await timing instruction for replacing (i.e., swapping) an older content stream, which may currently be displaying on one or more display devices, with a new content stream 322 including the playlist 222. In some embodiments, the server 208 (e.g., a Cloud-based service) may replace (i.e., swap in the streaming database 320) an older playlist with new playlist 222, the new playlist 222 may become an active content stream 322 to display on one or more display devices.

According to some embodiments, the server 208 (e.g., a Cloud-based service) may create a video file from the at least one playlist 222 and encode the video file for the purpose of streaming the encoded video file to the at least one of the one or more display devices, where the encoded video may be decoded and displayed. In some embodiments, the server 208 (e.g., a Cloud-based service) may also add audio, if that option is selected by a user. In some embodiments, the server 208 may be hosted by a Cloud service provider.

In some embodiments, a server 208 (e.g., a Cloud-based service) may format and optimize playlists 222 for HTML5, which may be delivered instead of pure video to the one or more display devices 212 of FIG. 2. Referring back to FIG. 3, in some embodiments, the server 208 (e.g., a Cloud-based service) may stream video using the H.263 or higher standard. In some embodiments, the server 208 (e.g., a Cloud-based service) may send text and images that from articles 232 in the playlist 222, in the much more compact and efficient base HTML5 format. In some embodiments the server 208 may send identical user generated content 230 to one or more display devices simultaneously. Further, in some embodiments the server 208 may format and send the user generated content 230 to one or more connected display devices 212 that may be oriented either horizontally, or vertically (i.e., in portrait, or landscape modes).

In some embodiments, the server 208 (e.g., a Cloud-based service) may deliver HTML5 pages or screens to one or more display devices. In some embodiments, one or more display devices may convert HTML5 into a video-like display. In some embodiments, the server 208 (e.g., a Cloud-based service) may send text as HTML5 text, and pictures as static images. In some embodiments, the server 208 (e.g., a Cloud-based service) may combine, convert, and replay text and images on one or more display devices in a video like format. In some embodiments, the server 208 (e.g., a Cloud-based service) may embed actual video content within the HTML5 page (which may be done utilizing the H.263 protocol); similar to how HTML5 video is added to a web page. Delivering the user generated content 230 as HTML5 provides several advantages. First, the delivering may reduce the bandwidth requirements to and/or from the server 208 over any network. The reduction in bandwidth may be dependent on the ratio of non-video content to video content. Second, delivering the user generated content 230 as HTML5 may improve overall performance. If the user generated content 230 is re-shown on one or more display devices, then the user generated content 230 preferably does not have to be re-transmitted, nor decrypted again.

In some embodiments, the server 208 may store, process, and/or manage the user generated content 230. According to some embodiments, computing devices and/or display devices may store, process, and/or manage user generated content 230. In some embodiments, the server 208 may include account and/or user administration services databases. In some embodiments, the server 208 may be hosted in a MICROSOFT AZURE CLOUD environment (and/or equivalent cloud hosting service) on a single server using a SQL-Server database instance to store user data, the micro and display template library, the user generated content 230 (i.e., images, text, audio, and/or video), user playlists 222, a personal user generated content archive (i.e., database dedicated to a specific user's generated content), and content streams 322 including completed and processed user playlists 222 for viewing on one or more display devices, as well as on computing devices. In some embodiments, the server 208 may configure, process, and deliver content streams 322 using HTML5 formatted data to one or more display devices, or one or more computing devices. In some embodiments, the server 208 may initiate and maintain the content stream 322 to each display device 212, and continue to maintain the content stream 322 even when the device is temporarily interrupted (e.g., by loss of network connection). In some embodiments, the server 208 (e.g., a Cloud-based service) may maintain the connection with one or more display devices while a content stream 322 is swapped by utilizing a single URL address to one or more display devices that may be maintained even while files are modified and swapped in the background.

Figure 4:
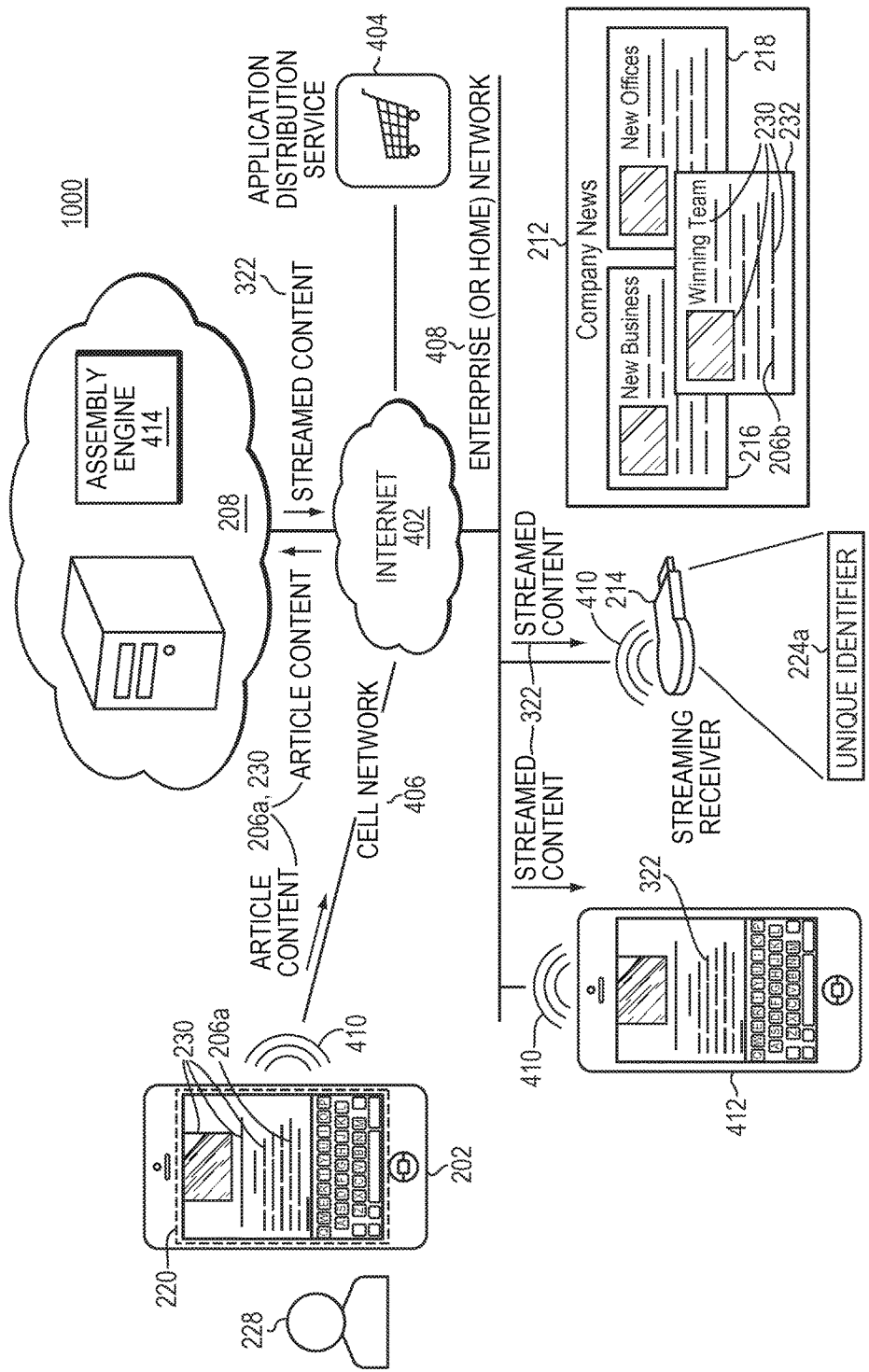
FIG. 4 illustrates a communications network diagram of the method and system, according to some embodiments.

FIG. 4 illustrates a network diagram of method (and system) 1000, according to some embodiments. In some embodiments, a user 228 using a computing device 202 may download an application (e.g., computer application) from an application distribution service 404 (such as an application store and/or application storage and/or application storage service) via one or more communication networks 402, 406, 408, 410. In some embodiments, the user 228 may install the application on the computing device 202. According to some embodiments, the communication network may include any of a wireless connection 410, a cellular phone network 406, the Internet 402, an enterprise or home network 408, and/or any other type of network connection.

In some embodiments, the user 228 using the computing device 202 may open the installed application with a user interface 220, where the user 228 is able to capture, select and enter user generated content 230 (may include but is not limited to combinations of images, text, audio and/or videos) into the user interface 220. According to some embodiments, the user 228 may enter the user generated content 230 into the micro-template 206a to simplify the process of data capture and entry. In some embodiments, the computing device 202 may transfer the user generated content 230 entered into the micro-template 206a over a communication network (i.e., a wireless connection 410, a cellular phone network 406, and/or the Internet 402) to the server 208 (e.g., a Cloud-based service).

In some embodiments, the server 208 (e.g., a Cloud-based service) may assemble the user generated content 230 by extracting the user generated content 230 from the microtemplate 206a and may reorganize the extracted user generated content 230 into a content stream 322. In some embodiments, the server 208 may transfer the content stream 322 over a communication network (i.e., the Internet 402, enterprise or home network 408, and wireless connection 410) to one or more display devices 212. In some embodiments, the content stream 322 may include the playlist 222, with one or more articles 232.

Referring to FIG. 4, according the some embodiments, the content stream 322 may also be transferred to and viewed on one or more computing devices 202, 412. In some embodiments, one or more display devices 212 may include a television monitor with a wireless streaming receiver 214 connected via the television monitor's HDMI port. In some embodiments, one or more display devices 212 may receive the content stream 322. In some embodiments, one or more display devices 212 may display the content stream 322 resulting in visual production of display templates 206b, 216, and 218. In some embodiments, the content stream 322 may display as a professionally formatted dynamic visual, which may cycle through user generated content 230/display templates 206b, 216, 218 in an interesting way, such that the final presentation may resemble motion video as it plays on the display 212.

Some embodiments of the system for distributing content may comprise one or more computing devices 202, 412, one or more servers 208, one or more display devices 212, and an assembly engine 414. Some embodiments of the system for distributing content may include a network 402, 406, 408, 410 configured to communicatively couple the one or more computing devices 202, 412, the server 208, the one or more display devices 212, and the assembly engine 414. In some embodiments, the computing device 212 may be configured to execute a user interface 220. In some embodiments the user interface 220 may include a field 206a for accepting user generated content 230. In some embodiments the server 208 may be configured to store the user generated content 230, in a manner enabling assembling of the user generated content 230. In some embodiments, the assembly engine 414 may be configured to assemble the user generated content 230 stored at the server (and/or at a computing device 202,412 and/or at a display device 212). In some embodiments, the assembled user generated content may include at least one playlist 222 (of FIG. 2) comprising one or more portions of the user generated content 230.

Referring back to FIG. 4, in some embodiments, the assembly engine 414 may be further configured to communicate the assembled user generated content 230, which may include at least one playlist 222, from the server 208 to the one or more display devices 212. In some embodiments, the one or more display devices 212 may be configured to display the assembled user generated content 230 in a sequence defined by the at least one playlist 222, on at least one of the one or more display devices 212.

In some embodiments of the system for distributing content, the one or more display devices 212 may be further configured to assemble user generated content 230 including the at least one playlist 222.

In some embodiments of the system for distributing content, the assembly engine 414 may be further configured to convert the assembled user generated content 230 into a video file, encode the video file, and stream the encoded video file to one or more display devices 212. In some embodiments of the system for distributing content, the one or more display devices 212 may be further configured to decode the encoded video file. Encoding and decoding may be accomplished by common techniques.

In some embodiments of the system for distributing content, the server 208 may be further configured to initialize the one or more display devices 212, and each of the one or more display devices 212 may have a respective unique identifier 224a. In some embodiments, the server 208 may perform the initialization based upon the respective identifier 224a.

Figure 5:
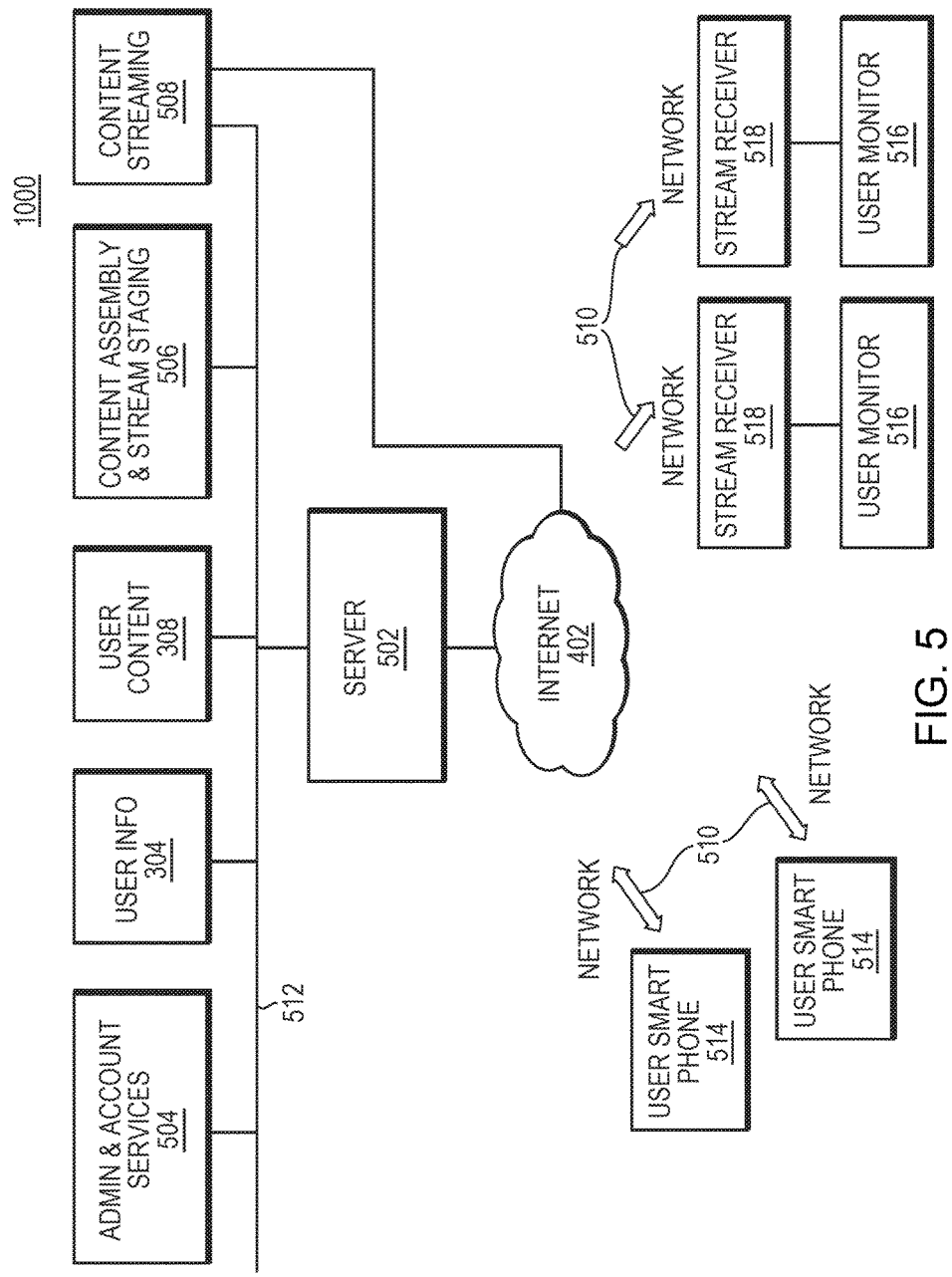
FIG. 5 illustrates a block diagram of the computer-based method and system, according to some embodiments.

FIG. 5 illustrates a block diagram of method (and system) 1000, according to some embodiments. In some embodiments, the method (and system) 1000 may utilize the Internet 402 as its principal communications backbone and infrastructure. According to some embodiments, the method (and system) 1000 may operate on a network 512 configured with one or more servers 502, routers, storage devices, and/or various application, security, database and/or other software.

In some embodiments, computing devices 514 and/or display devices 516 may access the network 512 (i.e., Local Area Network or LAN) through a server 502 (including but not limited to a front-end web server) that may control network access. In some embodiments, a server 502 may host user requests for services from various computing devices 514 using network 510 (i.e., cell data network, wireless network, or another network). According to some embodiments, a server 502 may include a front-end web server, a cloud-based software as a service (SaaS) server, a CLOUDBOARD server, and/or a CLOUDBOARD NEWS server.

In some embodiments, the network 512 may connect: (1) an Administration and Account Services Server 504; (2) a User Information Server 304; (3) a User Content Server 308; (4) a Content Assembly and Stream Staging Server 506; and (5) a Content Streaming Server 508. In some embodiments, an Administration and Account Services Server 504 may track access and commercial accounts of end users and other account owners. In some embodiments, a User Information Server 304 may include key user information that provides password and other security features. In some embodiments, a User Information Server 304 may further include user preferences, access control, feature access control, and/or transaction histories. In some embodiments, a User Content Server 308 may store user generated content and records of content transactions. In some embodiments, a Content Assembly and Stream Staging Server 506 may assemble submitted user generated content stored in content server 308 and/or other requests. In some embodiments, a Content Assembly and Stream Staging Server 506 may create a playlist from assembled user generated content. In some embodiments, a Content Assembly and Stream Staging Server 506 may convert a playlist into a content stream. In some embodiments, a Content Streaming Server 508 may be connected to both the internal network 512 and to the Internet 402. In some embodiments, a Content Streaming Server 508 may receive stored content streams from a Content Assembly and Stream Staging Server 506 and may communicate the content streams to display devices 516, and stream receivers 518.

In some embodiments, the Content Streaming Server 508 may send a content stream 508 through the Internet 402 to a network 510, and to media streaming devices 518 (i.e., a media receivers, and/or wireless media receiving sticks)

connected to television monitors 516 via a HDMI port. According to some embodiments, a network 510 may be a cell data network, wireless network, and/or any other network known in the art to communicate data.

Figure 6:
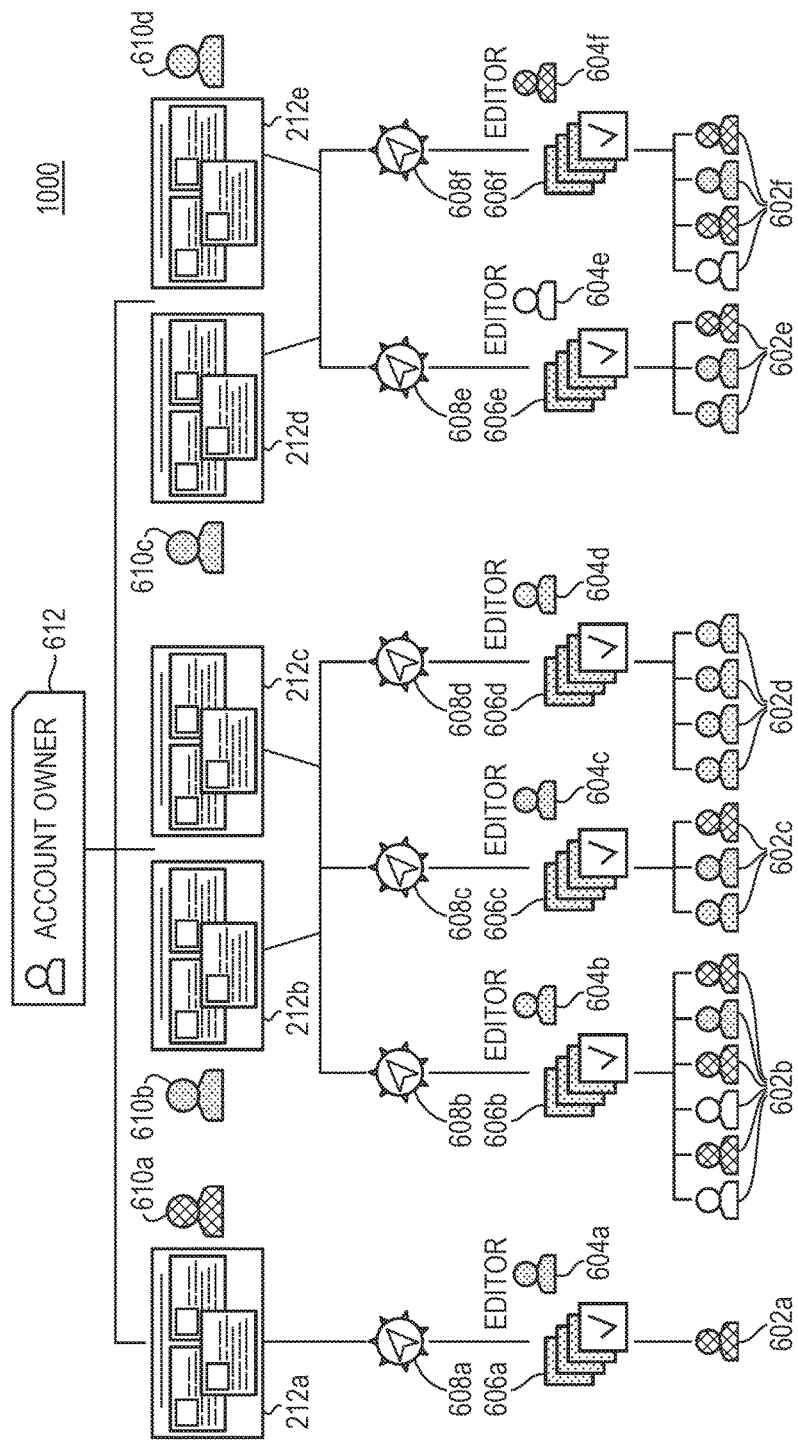
FIG. 6 illustrates a diagram of the utilization of channels for content distribution and editorial control, according to some embodiments.

FIG. 6 illustrates a diagram of the utilization of channels (including but not limited to communication, electronic, digital, analog, and/or other types of channels) for content (including but not limited to electronic content) distribution and editorial control, according to some embodiments of the method (and system) 1000. In some embodiments, the method (and system) 1000 may manage separation and control of a flow of user generated content by utilizing a channel concept. In some embodiments, one or more channel editors 604a-f and/or an account owner 612 may grant permission to one or more users 602a-f within an organization to submit user generated content (e.g., articles, pictures, text, audio, video, and/or other content) to one or more channels 608a-f. In some embodiments, users 602a-f may submit user generated content through an application user interface on one or more computing devices.

In some embodiments, users 602a-f may transfer user generated content from respective computing devices to channel editors 604a-f (i.e., channel owners) for review and possible approval. In some embodiments, channel editors 604a-f (i.e., channel owners, although five are shown, embodiments are not so limited and one or more channel editors may be employed) may review submitted user generated content (e.g., articles, pictures, text, audio, and/or video), and may select to post the submitted user generated content to a channel's content stream immediately, archive the submitted user generated content, and/or reject the submitted user generated content. When a channel editor 604a (i.e., channel owner or user) rejects submitted user generated content, in some embodiments, a server may send an automated message back to the corresponding submitting user 602a, saying the submitted user generated content is not displayed. In some embodiments, a channel editor 604a (i.e., channel owner) may approve a submitted article (i.e., user generated content) for immediate display on display device 212a. In some embodiments, the server may add an approved submitted article to a channel's 608a playlist, and may transmit a content stream, including a new appended playlist, to display device 212a.

In some embodiments, one or more channels 608a-f may each include a content stream. In some embodiments, display device owners 610a-d may set display devices 212a-e to display channels 608a-f. In some embodiments, the channels 608a-f may change content streams being communicated to display devices 212a-e, without interruption, because the display devices 212a-e may be configured to display one or more channels 608a-f independently of the specific content stream being communicated from the users 602a-f.

According to some embodiments, the method 1000 may manage viewing of user generated content on various display devices 212a-e and user computing devices. In some embodiments, registered users 602a-f may submit user generated content to one or more channels 608a-f. In some embodiments, channel editors 604a-f and/or an account owner 612 may grant registered users 602a-f permission to submit content to one or more channels 608a-f. According to some embodiments, an editor 604a (i.e., a channel owner) may control a channel 608a. In some embodiments, an editor 604a (i.e., a channel owner) may manage which users 602a-f may have access to the channel 608a, to submit user generated content and/or to view content streams. According to some embodiments, display device owners 610a-d may group display devices 212a-e to display different channels 608a-f at different times, and may sequence channels 608a-f in a string so that they can play in a continuous feed, and/or in a loop. In some embodiments, a display device manager 610b (i.e., a display device owner 610b who controls more than one display device 212b, 212c) may control a group of display devices 212b-c, which may be located in different rooms, facilities, or countries. In some embodiments, a display device manager 610b may have the ability to control channels 608b-d that display on display devices 212b-c and may schedule when each of the channels 608b-d may display on display devices 212b-c.

In some embodiments, an account owner 612 may control permissions for an entire organization (i.e., which users may submit user generated content to certain channels, which users have editorial credentials, which users control certain display devices, and/or other permissions).

In some embodiments, one or more computing devices may register display devices 212a-e to display device owners 610a-d when the display devices 212a-b are initialized. In some embodiments, one or more computing devices may store a display device's unique identifier on a server. In some embodiments, each display device 212a-e may have a unique identifier which may give a server the capability to send the channels (including but not limited to communication, electronic, digital, analog, and/or other types of channels) chosen by the display device owner to the correct display device (i.e., the display device intended by the user). Further, by storing both user identifications (i.e., user logins and passwords) and unique identifiers for each display device, in some embodiments, the server 208 may securely share user generated content with designated display devices and users. In some embodiments, the server 208 may code filenames and may encrypt user generated content at a server and decrypt the user generated content at a display device.

In some embodiments, the server may organize the user generated content into a plurality of channels 608a-f and may select at least one of the one or more channels 608a-f to display on the at least one of the one or more display devices 212a-e. In some embodiments, the server may filter 606a-f the user generated content within one or more of the plurality of channels 608a-f.

In some embodiments, one or more editors 604a-f may organize the user generated content into a plurality of channels 608a-f and may select at least one of the one or more channels 608a-f to display on the at least one of the one or more display devices 212a-e. In some embodiments, the one or more editors 604a-f may filter 606a-f the user generated content within one or more of the plurality of channels 608a-f. In some embodiments, filtering may include editing the user generated content.

As illustrated in FIG. 6, in some embodiments, a channel 608a may include a single user 602a, who may also act as the channel editor 604a by selecting user generated content to display on the channel via a simple editorial approval step 606a. Some embodiments of the method (and system) 1000 may include an editorial approval step 606a-f in a content submission process. In some embodiments, the server 208 may communicate a channel 608a to display device 212a. In some embodiments, display device owner 610a (i.e., display device manager) may own and control display device 212a. In some embodiments, display device owner 610a may select a channel 608a to display on a display device 212a.

Some embodiments of the method (and system) 1000 may utilize a more complex channel system including multiple channels 608b-f with multiple groups of users 602b-f submitting user generated content to various channel editors (i.e., owners) 604*b-f* for possible inclusion in content streams of channels 608*b-f*. In some embodiments, a user group 602*b* may submit user generated content to a channel editor 604*b*. In some embodiments, a channel editor 604*b* may select which user generated content appears on channel 608*b* through an editorial approval step (one or more of 606*a-f*).

In some embodiments, channel editors 604*a-f* may have editorial credentials. Some embodiments may grant editorial credentials during a user registration process. According to some embodiments, channel editors 604*a-f* may build one or more channels 608*a-f* from templates and available user generated content, which may include articles from other users 602*a-f* who may or may not have editorial control of a channel. For non-limiting example, in some embodiments, users 602*a*, 602*b*, 602*c*, 602*e*, 602*f* may transmit complete articles between channels within an organization, and to users 602*d* in different organizations using email, or other transfer mechanisms.

In some embodiments, the server may communicate channels 608*a-f* to one or more display devices 212*a-e* based on which of the more display devices 212*a-e* channel editors 604*a-f* select to receive a respective channel 608*a-f*. In some embodiments, the server may communicate one or more channels 608*a-f* to one or more display devices 212*a-e* based on the one or more channels 608*a-f* display device owners 610*a-d* select to receive and display on the respective one or more display devices 212*a-e*. For instance, in some embodiments the server may transmit channels 608*b-d* to display devices 212*b* and 212*c*, and display device owner 610*b* may select any combination of channels 608*b-d* to display on both display devices 212*b* and 212*c*. In some embodiments, the server may identify the channel editors 604*a-f* responsible for one or more channels 608*a-f* and may pair one or more channels 608*a-f* with locations (i.e., one or more display devices 610*a-d*) that are authorized to view the respective one or more channels 608*a-f*. In some embodiments, channel editors 604*a-f* (i.e., channel owners) may authorize display devices owners 610*a-d* to view one or more channels 608*a-f*. Some embodiments of the method (and system) 1000 may include a public channel 608*d*. In some embodiments, a public channel 608*d* may originate from outside of an organization. In some embodiments, a public channel 608*d* may be comprised of user generated content submitted from user group 602*d*, who may not include members of the same organization of display device owner 610*b*. Further, in some embodiments, the editor 604*d* may have editorial control 606*d* over channel 608*d* and/or may not be a member of the same organization of display device owner 610*b*. In some embodiments the server may transfer public channel 608*d* to display device 212*c* and display device owner 610*b* may select whether or not to display channel 608*d* on display device 212*c*.

In some embodiments, the server may allow users 602*a-f* to view channels on computing devices. According to some embodiments, users 602*a-f*, channel editors 604*a-f*, and display device owners 610*a-d* may preview channel content sequencing and timing on computing devices to confirm a content stream is displaying correctly.

Figure 7:
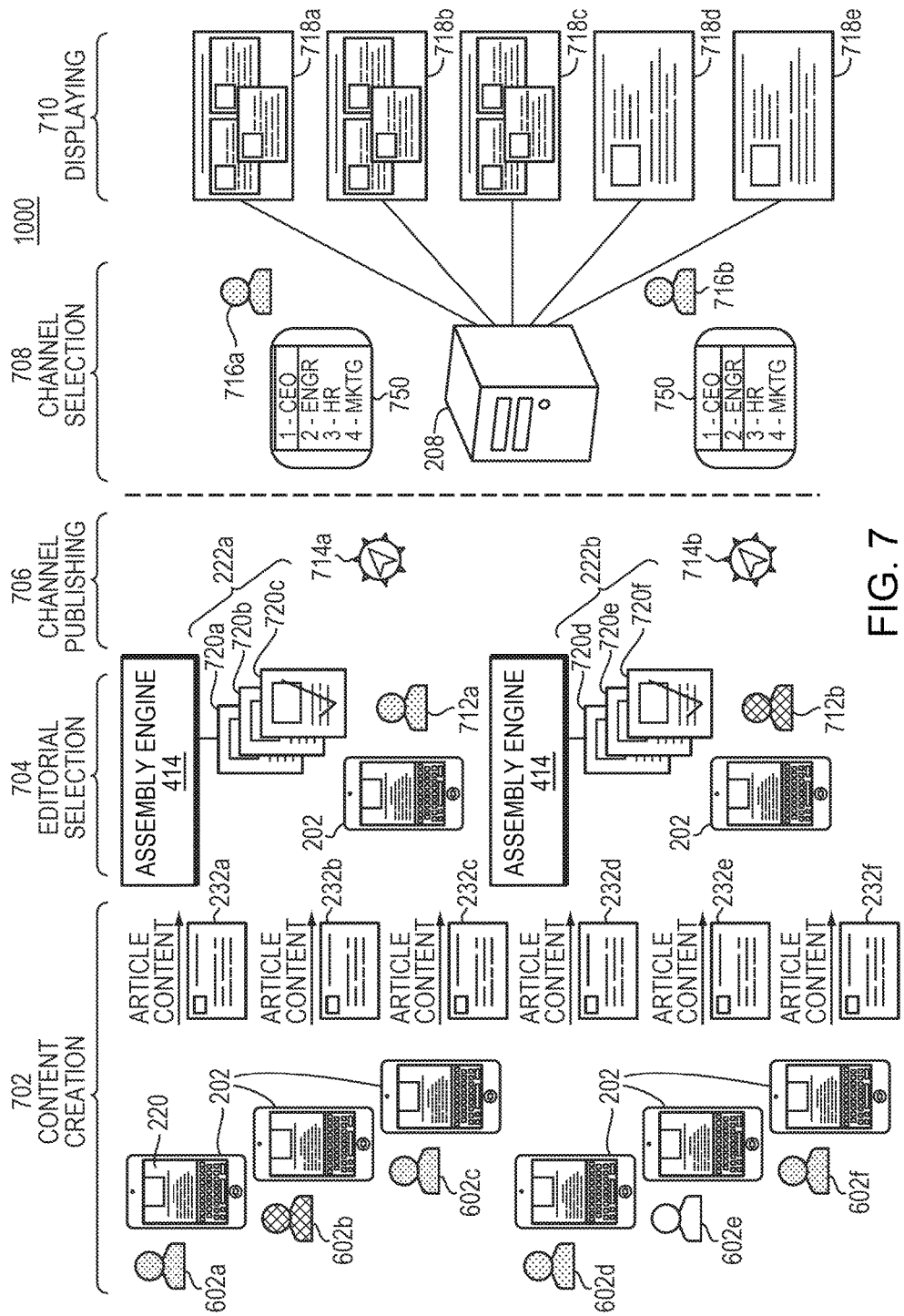
FIG. 7 illustrates a diagram of a content publishing approval process and a method for distributing and staging electronic content for display, according to some embodiments.

FIG. 7 illustrates a diagram of the user generated content 232*a-f* (i.e., collection of articles and/or article content) approval process and the process for distributing and staging user generated content 232*a-f* for display, according to some embodiments of the method (and system) 1000. In some embodiments, Content Creation 702 may include users 602*a-f* using respective computing devices 202 to individually submit user generated content 232*a-f* (i.e., collection of articles and/or article content). In some embodiments, user generated content 232*a-f* may include any of text, headline text, images, audio, and/or video. In some embodiments, user generated content 232*a-f* may depend on the type of article, template, and/or and settings that users 602*a-f* select.

In some embodiments, computing devices 202 may transmit user generated content 232*a-f* from the users 602*a-e* to channel editors 712*a-b*. In some embodiments, during Editorial Selection 704, a channel editor 712*a-b* may approve user generated content 720*a-f* for display on channel 714*a-b*. In some embodiments, channel editors 712*a-b* may view a preview of how the approved user generated content 720*a-f* appears on one or more display devices 718*a-e*. In some embodiments, channel editors 712*a-b* may post approved user generated content 720*a-f* immediately, store the user generated content 232*a-f* (i.e., collection of articles and/or article content) in an archive for later retrieval, and/or reject the user generated content 232*a-f* In some embodiments, a channel editor 712*a* may approve (i.e., select) user generated content 232*a-c* from a respective users 602*a-c*, to assemble the user generated content 720*a-c* into a playlist 222*a*. In some embodiments, the server 208 may transmit channel 714*a*, which includes a content stream of the playlist 222*a*, to one or more display devices 718*a-c*. In some embodiments, the server may identify the channel editor 712*a* responsible for a particular channel 714*a* (i.e., a particular content stream) and may pair that channel 714*a* and the associated content stream with locations (i.e., display devices 718*a-c* and computing devices 202) that are authorized to view the channel 714*a* and the associated content stream.

In some embodiments, Channel Publishing 706 may include approved user generated content 720*a-f*, in the form of a playlist 222*a-b*, being published to an associated channel 714*a-b*. According to some embodiments, Channel Selection 708 may include display owners 716*a-b* selecting, on channel display 750 of computing devices 202, which of the one or more channels 714*a-b* to display on display devices 718*a-e*. In some embodiments, Displaying 710 may include displaying selected one or more channels 714*a-b* on display devices 718*a-e*.

In some embodiments of the method (and system) 1000, one or more assembly engines 414 may be further configured to organize the user generated content 232*a-f* (i.e., collection of articles and/or article content) into a plurality of channels 714*a-b* and select one or more channels 714*a-b* to display on the one or more display devices 718*a-e*. In some embodiments of the system for distributing content, the assembly engine 414 may be further configured to filter the user generated content 232*a-f* of one or more of the plurality of channels 714*a-b*.

In some embodiments, the server 208 may distribute user generated content from one or more computing devices 202 to a display device 718*a-e*. Some embodiments of the method (and system) 1000 may begin by communicatively coupling the one or more computing devices 202, a server 208, and the display device 718*a*. In some embodiments, one or more computing devices 202 may execute a user interface 220. In some embodiments, the user interface 220 may include a field for accepting user generated content 232*a-c*. In some embodiments, the server 208 may accept the user generated content 232*a-c* from a plurality of users 602*a-c*. In some embodiments, the server 208 may store the user generated content 232*a-c*. In some embodiments, the server 208 may create one or more channels 714*a* by filtering the user generated content 232*a-c* and compiling the filtered user generated content 232*a-c* into the one or more channels 714a. In some embodiments, the method (and system) 1000 may communicate the one or more channels 714a from the server 208 to the display device 718a. In some embodiments, device owner 716a may select at least one of the one or more channels 714a to display on the display device 718a. In some embodiments, the display device 718a may display the at least one of the one or more channels 714a. In some embodiments, the server 208 may modify the user generated content 232a-c while preserving communication of the one or more channels 714a from the server 208 to the display device 718a.

Figure 8:
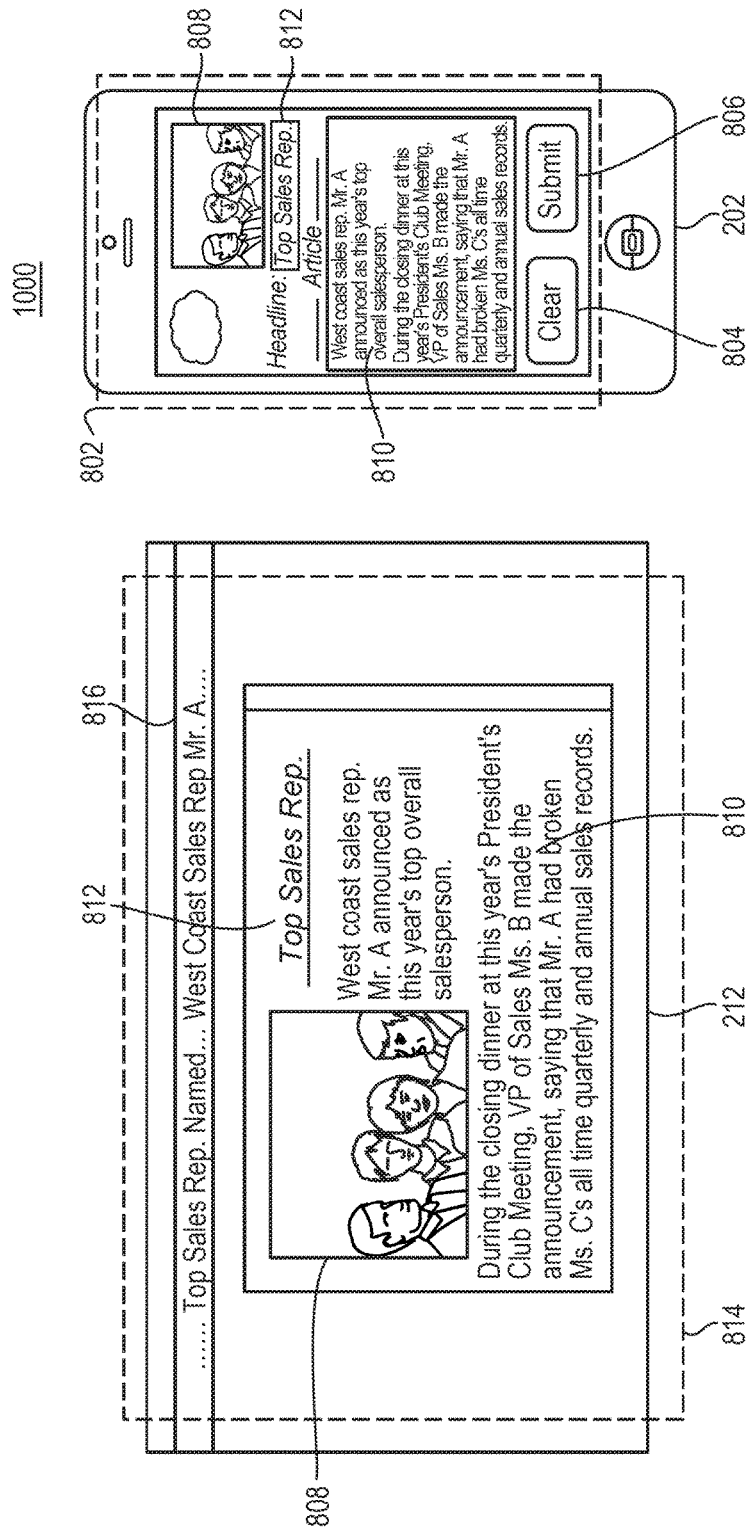
FIG. 8 illustrates a micro-template and a display template, according to some embodiments.

FIG. 8 illustrates a micro-template 802 and a display template 814, according to some embodiments. In some embodiments, a computing device 202 may use a micro-template 802 (i.e., a template designed for use on a mobile computing device 202 with particular fields to accept user generated content 808, 810, 812), to accept user generated content 808, 810, 812 from a user on the user's computing device 202. In some embodiments, the mobile computing device 202 may utilize a micro-template 802 to accept user generated content 808, 810, 812 on a computing device 202 in an organized and simple manner. In some embodiments, the mobile computing device 202 may utilize a micro-template 802 to create an article. In some embodiments, a micro-template 802 may include an area for incorporating images 808, an area for descriptive headline text 812, and/or an area for detailed article text 810. In some embodiments, a micro-template 802 may include a submit button 806 for submitting an article, and/or a clear button 804, for clearing the contents of the micro-template 802.

In some embodiments, a computing device 202 may accept user generated content 808, 810, 812 and may store the accepted user generated content 808, 810, 812 on a server, where the accepted user generated content 808, 810, 812 may be reorganized in a display template 814. Accordingly, in some embodiments the server may utilize display templates 814 to reorganize accepted user generated content 808, 810, 812 for display on one or more display devices 212. According to some embodiments, a display template 814 may take on limitless forms. Some non-limiting examples of display templates 814 may include:

a) News/Message Board. In some embodiments, News/Message Board display templates 814 may scroll user generated content 808, 810, 812 comprised of an optional headline 812 and a content field. In some embodiments, the user generated content 808, 810, 812 may include text, images, and/or a mix of text and images. In some embodiments a display template 814 may include an optional "ticker" component 816 at the bottom or top of the screen for rapidly changing information, and/or sponsor information including advertisements. In some embodiments, a display device 212 may support video content, external news, weather, RSS feeds, web-pages, PowerPoint slides, social media streams, and/or uniform resource locators (URLs).

b) Community Posting Board. In some embodiments, Community Posting Board display templates may support "bulletin board-like" applications and user generated content 808, 810, 812, such as post-it notes, employee notifications, government regulations documents, charts, and/or calendars. In some embodiments a display template 814 may include "picture-in-picture" functionality, where part of the screen is video and/or scrolling content.

c) Image Plus Video Board. In some embodiments, Image Plus Video Board display templates may support display of a PDF file on one side and a presentation on the other side. The presentation may be static, dynamic, animated, and/or a live video feed.

According to some embodiments, a user may customize and configure display templates 814 to incorporate different background styles, colors, company branding themes and/or logos. In some embodiments, display templates 814 may support both landscape and portrait orientations. In some embodiments, landscape may be the default orientation. In some embodiments, the server 208 and/or the display device 212 may convert text into speech, and/or deliver the text in both mediums.

As illustrated in FIG. 8, in some embodiments the display device 212 may utilize the display template 814. In some embodiments, the server 208 may utilize display template 814 to prepare user generated content 808, 810, 812 for presentation on one or more display devices 212. In some embodiments, the server may assemble user generated content 808, 810, 812 by extracting the user generated content 808, 810, 812 from a micro-template 802 and reorganizing the extracted user generated content 808, 810, 812 into a display template 814. According to some embodiments, a display template 814 and a micro-template 802 may vary depending on the type of presentation experience a channel editor wishes to place on a content stream. In some embodiments, a typical template may include an image 808, body text 810, headline 812, and/or a ticker 816 that may present text summaries of headline 812 and/or article text 810 across the screen of one or more display devices 212.

In some embodiments, the server 208 may convert and incorporate social media messages as user generated content. Some embodiments of the method (and system) 1000 allow users to easily convert and incorporate social media posts into micro-templates, by extracting content from selected social media posts and organizing the content into a micro-template. In some embodiments, an editor of a channel may inspect and approve a converted social media post before the converted post is displayed on a display device. This may allow an organization to extract messages from many incompatible information sources and combine them into a single news broadcast environment that may include display on large screen display devices located in public spaces.

In some embodiments, users may submit one or more social media posts utilizing a user interface executed on one or more computing devices. In some embodiments, the one or more computing devices may store the submitted one or more social media posts on the server, in a manner enabling assembling of the submitted one or more social media posts into at least one playlist. In some embodiments, assembling the submitted one or more social media posts may include converting and incorporating the one or more social media posts into a display template by extracting content from the submitted one or more social media posts and reorganizing the content into a display template. In some embodiments, channel editors may filter, which may include editing, the submitted one or more social media posts within one or more of the plurality of channels (including but not limited to communication, electronic, digital, analog, and/or other types of channels).

In some embodiments, users may load an application on a computing device 202 to create articles for display on one or more display devices 212. In some embodiments, an application may select from locally stored and/or created user generated content 808, 810, 812 (i.e., pictures, videos, social media posts, among others) and may organize the selected user generated 808, 810, 812 content into a micro-template 802 to create an article for display on one or more display devices 212. In some embodiments, an application may select user generated content 808, 810, 812 from a server 208 (e.g., archives, databases, libraries, among others). Some embodiments may create minimalist articles. In some embodiments, minimalist articles may simply be an image 808, or an image 808 with an accompanying caption.

In some embodiments, an application may treat photos and/or images 808 that are submitted in articles that have no headline 812 or text 810 as a special case. In some embodiments, users may submit only a photo instead of using a micro-template 802 arrangement for building an article. In some embodiments, the server 208 and/or the display device 212 may enlarge the photo 808 to fill the screen of a display device 212 and may omit most other formatting on the display device 212, leaving a photo 808 presented for a user-determined time/duration on the display device 212. In some embodiments, a micro-template 802 may include options, which the user may select, to control which display template is used or how the display template looks.

Figure 9:
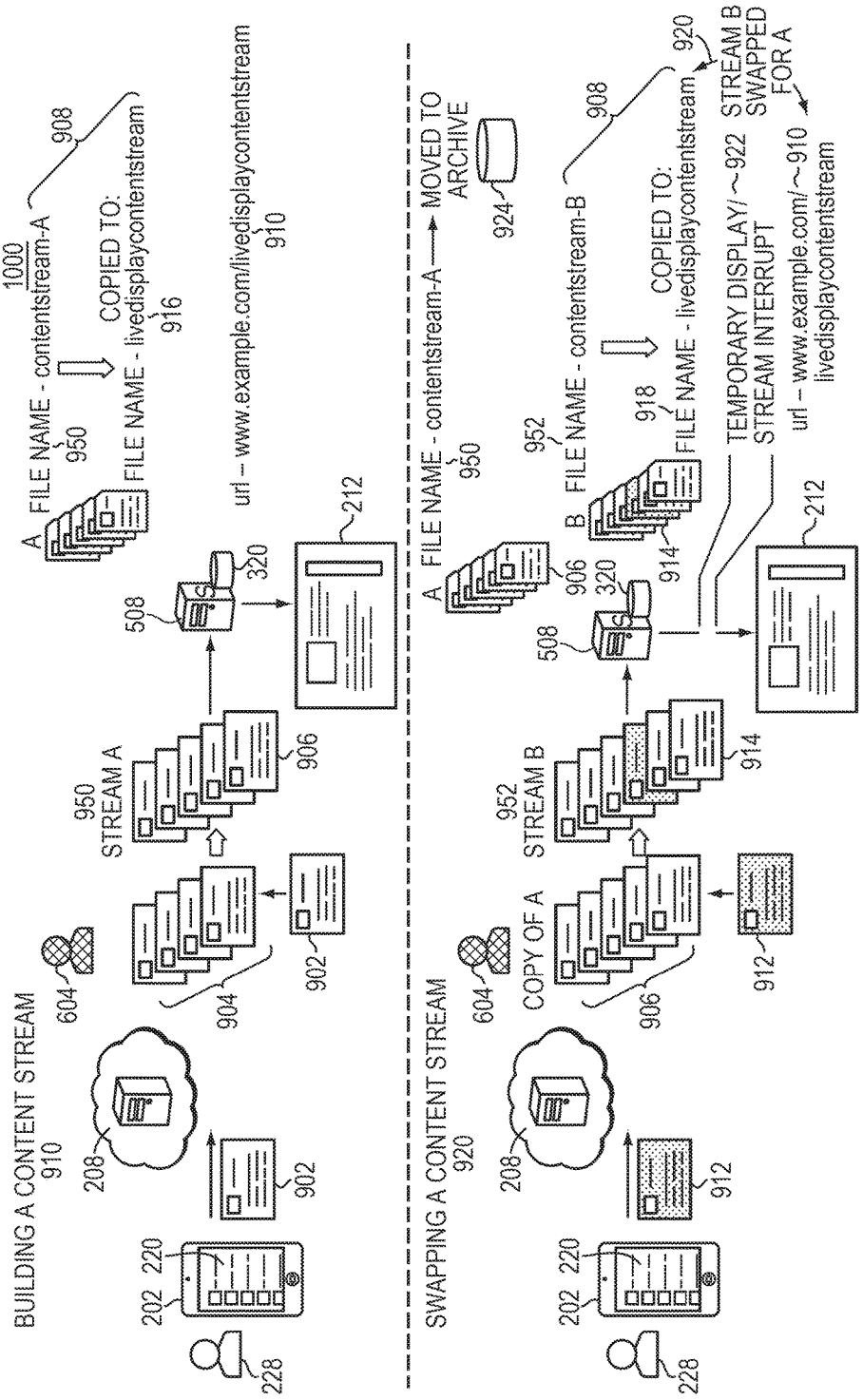
FIG. 9 illustrates a diagram of a method (and system) for creating and swapping electronic content streams, according to some embodiments.

FIG. 9 illustrates a process 910 for creating and swapping content streams in order to modify user generated content displayed on display devices, according to some embodiments. In some embodiments, a user 228 may create user generated content 902 on a computing device 202, using an application with a user interface 220 running on the computing device 202. In some embodiments, a user 228 may submit user generated content 902 to a server 208 (e.g., a Cloud-based service).

In some embodiments, a channel editor 604 may approve submitted user generated content 902 for publication to a content stream 906. In some embodiments, the server 208 may assemble (i.e., aggregate, or combine) approved user generated content 902 with other user generated content 904 into a content stream 906 (i.e., Stream A 950, playlist). In some embodiments, the server 208 may send a content stream 906 to a content streaming server 508 (which may be part of or separate from server 208). In some embodiments, the server 208 may store content stream 906 in streaming database 320.

In some embodiments, a process 908 on the server 508 may copy the file including the content stream 906 and rename the copy 916 with a filename (e.g., livedisplaycontentstream) appropriate for streaming to a display device 212. In some embodiments, the server 208 may assign the copied file 916 a URL 910 (e.g., www.example.com/livedisplaycontentstream) and may serve the copied file 916 over a network communicating with a display device 212. According to some embodiments, the content stream 906 may repeat and play uninterrupted on the display device 212, until a user 228, a channel editor 604, and/or a server 208 (e.g., a Cloud-based service) terminates play.

As illustrated in the process 920 of FIG. 9, in some embodiments, a content stream 906 may already exist and may currently be streaming to a display device 212, and a user 228 may want to add new or modify the content stream. In this case, the method (system) 1000 may utilize a swapping process 920 to accomplish the change. According to some embodiments, a swapping process 920, located on the server 208, may begin similarly to the original content creation process 910, except a user 228 may enter new or modified user generated content 912 into a computing device 202. In some embodiments, users may submit new or modified user generated content 912 to a server 208 (e.g., a Cloud-based service). In some embodiments, a channel editor 604 may approve new or modified user generated content 912 for publication to a content stream 906. In some embodiments, the server 208 may reassemble the user generated content 912 and may combine the user generated content 912 with the content stream 906, resulting in a new content stream 914. In some embodiments, the server 208 may send content stream 914 to the content streaming server 508 (which may be part of or separate from server 208). In some embodiments, the server 208 may store the content stream 914 in the streaming database 320. In some embodiments, a process 908, located on the server 208, may copy the file of the content stream 914 and may rename the copy 918 with a filename (e.g., livedisplaycontentstream) appropriate for streaming to a display device 212. In some embodiments, the server 208 may move the previous content stream 906 to an archive database 924 (which may be part of or separate from server 208).

According to some embodiments, a streaming server 508 (which may include but is not limited to the server 208) may initiate the file swapping process 920. According to some embodiments, the file swapping process 920 on the streaming server 508 may convert the new content file (i.e., contentstream B, element 952) to a streaming file and may change the filename to that of the current streaming file 918 (i.e., livedisplaycontentstream). In some embodiments, the server may replace the old content stream file 916 with the new content stream file 918 at a timed point in the content delivery that permits a logical break and/or stream interrupt 922 (as known to one skilled in the art) in communications with a display device 212, such that the display device 212 continues display of the content stream without halting or delivering an error condition. In some embodiments, the replacement is accomplished because there is no change in the streamed file's 918 location and/or name.

Referring to FIG. 9, according to some embodiments, the above described swapping process 920 may vary depending on the nature of one or more display devices 212 (i.e., depending on the device manufacturer, communications standards used on the device, hardware and software capabilities of the device, such as memory, and/or the ability to run software applications natively). In some embodiments, the display devices 212 may utilize local memory and applications located on the display devices 212 by downloading the content streams 950, 952 to one or more display devices 212, and performing the stream swapping 920 locally on the one or more display devices 212. In other embodiments, the display devices 212 may download and mix the user generated content 906, 914 locally on one or more display devices 212 as user generated content 906, 914 is available, with, or without conversion to old and new streaming files 916, 918, respectively. According to some embodiments, a display device 212 may accept two complete versions of the old and new streaming files 916, 918, respectively, and simply change over to a new streaming file 918 when the streaming file 918 has completely downloaded.

Some embodiments of the method (and) system 1000 are capable of an uninterrupted stream of "continuously changing" user generated content 906, 914 on remote display devices. According to some embodiments, while maintaining a continuous connection with a display device 212 displaying content, a server 208 may simultaneously process modified or entirely new user generated content 914. In some embodiments, the server 208 may utilize a single URL 910 to communicate a content stream 906, 914 to the display device 212. In some embodiments, while the display device 212 is displaying a content stream 906, a server 208 may modify the content stream 906 linked to a URL 910 (the extent of modification can be anywhere from slight to completely new). In some embodiments, a new or modified content stream 914 and a currently displayed content stream 906 are swapped 920 at an appropriate time 922 while maintaining a perceived fluid playback of one or more streams 906, 914. According to some embodiments, no user interaction is necessary to maintain content streams 906, 914, even while a server 208 swaps 920 content streams 906, 914.

Referring to FIG. 9, in some embodiments, the server 208 may associate at least one of the one or more display devices 212 and the assembled user generated content 906 which may include the at least one playlist, with one or more locations 910 on the server 208. In some embodiments, the server 208 may transmit a first stream 906 of the assembled user generated content 906 which may include the at least one playlist, from the server 208 to the at least one of the one or more display devices 212. In some embodiments, the server 208 may update the assembled user generated content 906 which may include the at least one playlist. In some embodiments, the server 208 may transmit the updated stream of assembled user generated content 914 to the at least one of the one or more display devices 212, while preserving the transmission of the first stream 906.

In some embodiments, the server 208 may be further configured to store the assembled user generated 906 content in one or more locations 910. In some embodiments, the server 208 may modify the assembled user generated content 906 stored in the one or more locations 910 while preserving streaming communication of the assembled user generated content 906 between the server 208 and the one or more display devices 212.

In some embodiments, the assembled user generated content 906 may be stored in one or more locations 910 at a server 208. In some embodiments, the server 208 may modify the assembled user generated content 906 stored in the one or more locations 910 at the server. In some embodiments, the server 208 may preserve streaming communication of the assembled user generated content 906 to the one or more display devices 212.

Some embodiments of the method (and system) 1000 are capable of sophisticated record keeping regarding the display of content within an organization. Such record keeping may include but is not limited to: (1) user generated content records (including but not limited to time stamps) for everything that may be displayed on a display device throughout in the world; (2) database services on data, such as audit trails; and (3) archiving content with the capability to vary archive times depending on service level. In some embodiments, a server 208 may implement record keeping functions. In some embodiments, the server 208 may be configured with databases with relational databases, and/or NOSQL (i.e., non-relational) databases.

Figure 10:
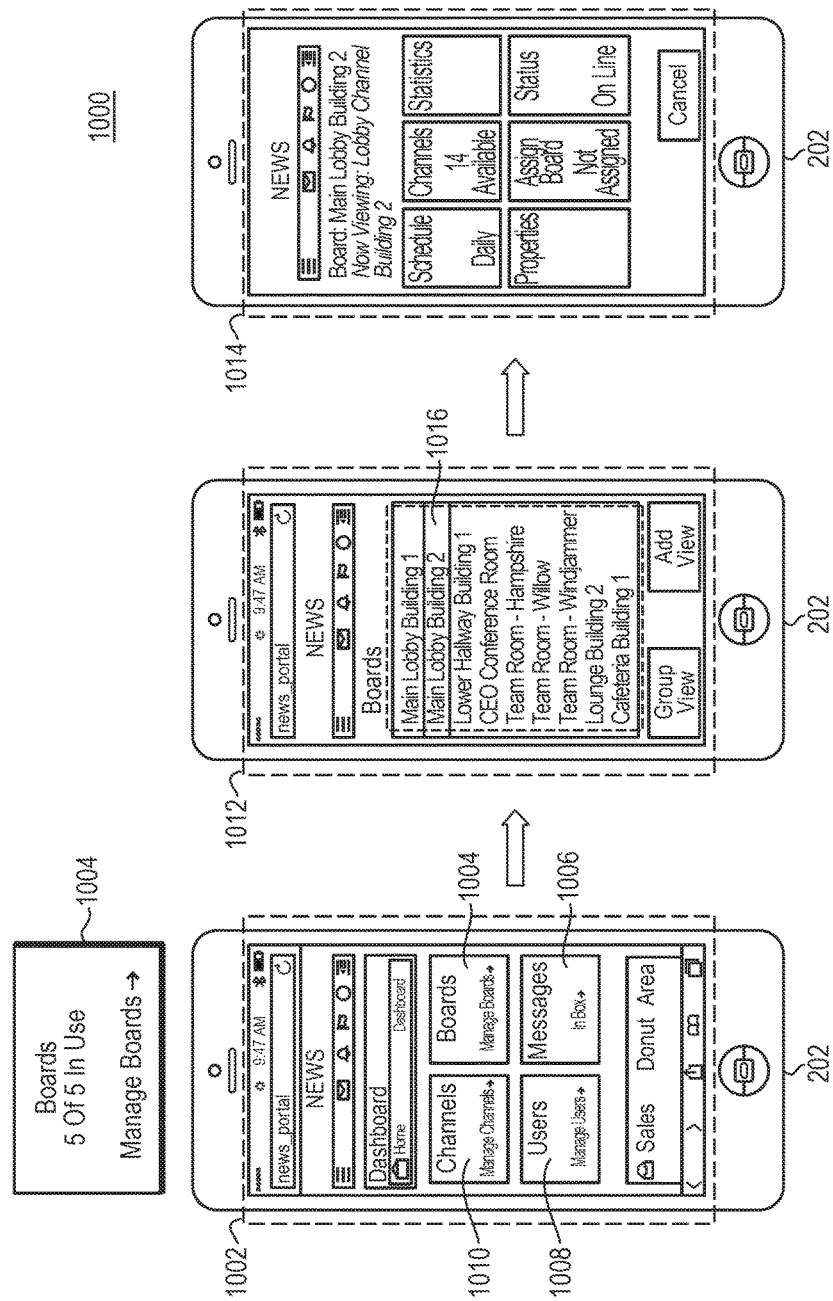
FIG. 10 illustrates a graphical user interface, and operations and functions thereof, according to some embodiments.

FIG. 10 illustrates the basic functionality of an application's user interface on computing device 202, according to some embodiments. In some embodiments, an application's user interface is designed to be simple, and easy to understand and use. In some embodiments, the top-level function menu 1002 of a user interface may be broken down into four principal components (collectively, 1004, 1006, 1008, and 1010).

According to some embodiments, a top-level function menu 1002 of a user interface may include a Channels component 1010 for managing channels (including but not limited to communication, electronic, digital, analog, and/or other types of channels) of user generated content. In some embodiments, a Channels component 1010 may be available to channel editors (i.e., channel owners) and is not required to be visible to other users. According to some embodiments, a Channels component 1010 may allow channel editors to: (1) select which user generated content displays on a channel; (2) see a list of users who have access to a channel and/or who may contribute user generated content to the channel; (3) see a list of, and/or approve, display devices that may view a channel; and/or (4) select and/or configure display templates to process content, among other capabilities.

In some embodiments, the computing device 202 may utilize a Boards component 1004 of a top-level function menu 1002 to manage and control display devices. In some embodiments, a Boards component 1004 may provide display devices owners the ability to: (1) configure new display devices to communicate with a server; (2) select channels to display on each display device; (3) define groups of display devices that may be controlled together; (4) set a schedule for which channels play on each display device and/or at which times; and/or (5) request access to new channels from channel editors (i.e., channel owners), among other capabilities.

In some embodiments, a top-level function menu 1002 may include a Users component 1008 that provides the ability to manage users on the system. According to some embodiments, a Users component 1008 may allow: (1) new users to be added; (2) users to be assigned channels; and/or (3) channel editors (i.e., channel owners) visibility into the user list for the channel, among other functions.

In some embodiments, a top-level function menu 1002 may include a Messages component 1006 that allows users to manage messages sent to and from other users. In some embodiments, a Messages component 1006 may provide a way for users to send and/or receive message requests to post content, and/or for channel editors (i.e., channel owners) to approve content for publishing, among other uses.

According to some embodiments, each component of a top-level function menu 1002 may include multiple additional selection and data presentation layers 1012, 1014, respectively (i.e., drill down menus), depending on the various needs of a user, and the specific functionality of certain features and settings. FIG. 10 illustrates two levels below a top-level function menu 1002 for a Boards component 1004. According to some embodiments, a user may select the Boards component 1004 and the user interface may change to a second menu level 1012, where the user interface may present the user with a list of display devices 1016. In some embodiments, a user may select a display device from a list 1016 on the second menu level 1012, and the user interface may change to a third menu level 1014, where the user interface may present the user with optional settings related to the selected display device.

Figure 11:
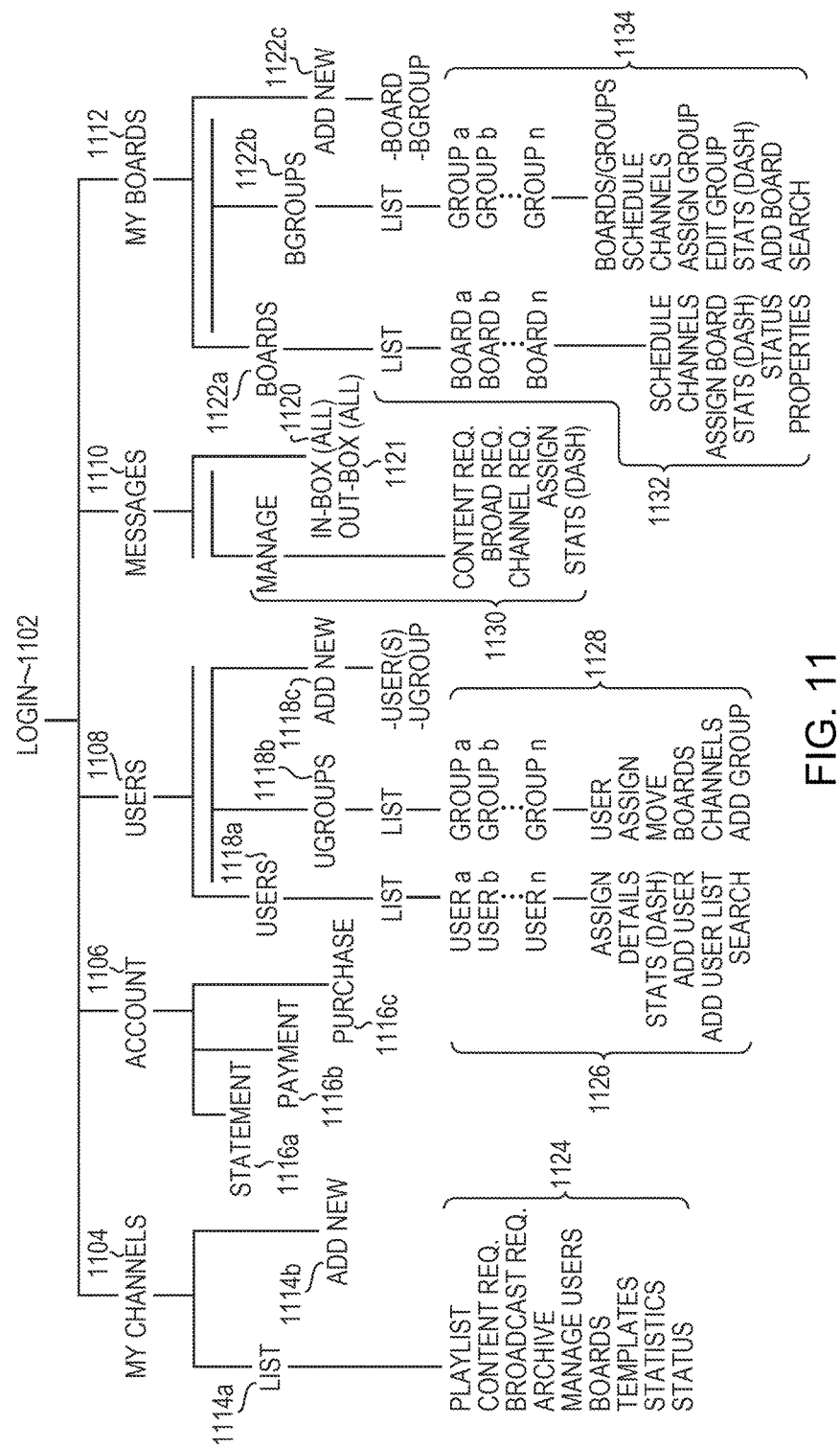
FIG. 11 illustrates a user interface structure of an application, according to some embodiments.

FIG. 11 illustrates a user interface structure of an application of the method (and system 1000), according to some embodiments. In some embodiments, a user may launch an application (illustrated in FIG. 11) on a computing device 202, and the application may present the user with a login screen 1102, where registered users may login. According to some embodiments, a level of a user interface may include sub-menus My Channels 1104, Account 1106, Users 1108, Messages 1110, and My Boards 1112.

In some embodiments, a user may select a My Channels sub-menu 1104. In some embodiments the application of FIG. 11 may present a user with menu options: (1) List 1114a, which may list channels associated with that user; and/or (2) Add New 1114b, which may add a new channel. According to some embodiments, a user may select List 1114a, and the application may present a list of channels, with further options 1124.

In some embodiments, a user may select an Account 1106 sub-menu, and some embodiments may present the user with the menu options Statement 1116*a*, Payment 1116*b*, and/or Purchase 1116*c*.

In some embodiments, a user may select a User 1108 sub-menu, and some embodiments may present the user with menu options: (1) List 1118*a*, which may list users; (2) UGroups 1118*b*, which may list different groups of users; and (3) Add New 1118*c*, which may add new users or groups of users. According to some embodiments, a user may select to list the users or groups, and the application may present the user with further options 1126 and 1128.

In some embodiments, a user may select a Messages 1110 sub-menu, and the application may present the user with options to manage messages 1130, and/or In-Box 1120 and/or Out-Box 1121, which may include received and sent messages.

In some embodiments, a user may select a My Boards 1112 sub-menu, and in some embodiments the user interface may present the user with menu options: (1) Boards 1122*a*, which may list display devices associated with that user and further options 1132 for each display device listed; (2) BGroups 1122*b*, which may list groups of display devices associated with that user and further options 1134 for each group of display devices listed; and (3) Add New 1122*c*, which allows the user to add new display devices.

Figure 12:
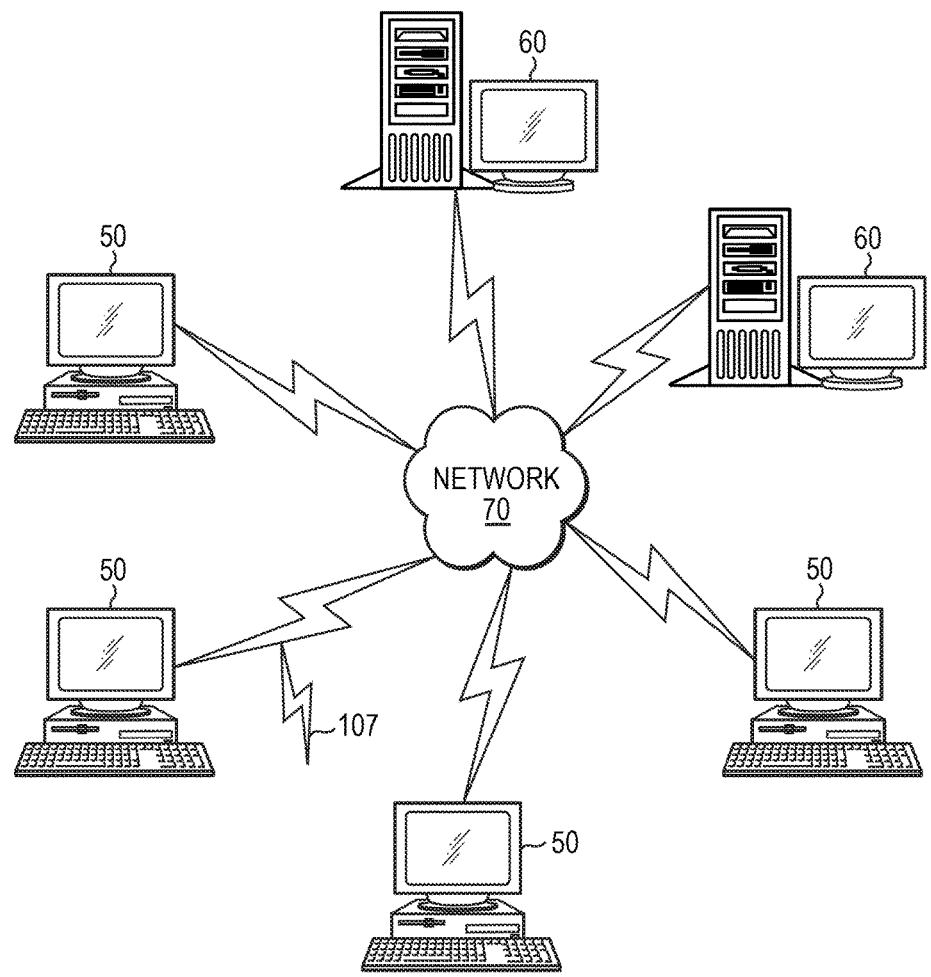
FIG. 12 illustrates a computer network or similar digital processing environment in which embodiments of the present invention may be implemented.

FIG. 12 illustrates a computer network or similar digital processing environment in which embodiments of the present disclosure may be implemented.

Client computer(s)/devices 50 (i.e., computing devices/display devices) and server computer(s) 60 (i.e., a Cloud-based service) provide processing, storage, and input/output devices executing application programs and the like. The client computer(s)/devices 50 (i.e., computing devices/display devices) can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH™, etc.) to communicate with one another. Other electronic device/computer network architectures are suitable.

Client computers/devices 50 (i.e., computing devices/display devices) may be configured with an application for accepting and submitting user generated content, according to some embodiments. Server computers 60 may be configured with the application which communicates with client devices 50 (i.e., computing devices/display devices) for accessing and processing user generated content. The server computers 60 may be separate server computers or part of cloud network 70. In some embodiments, the server computer 60 (e.g., content processors, databases) may communicate with one or more computer applications.

The server computer 60 (i.e., a Cloud-based service) may include a database, configured to accept user generated content. The obtained user generated content may include text, images, audio, and/or video. The server computer 60 (i.e., a Cloud-based service) may also include an assembly engine (as part of or communicatively coupled to the database), configured to obtain the user generated content from the database to process and combine the user generated content for display on Client computers/devices 50 (i.e., display devices). The assembly engine may also be configured to communicate the processed and combined content to Client computers/devices 50 (i.e., display devices). The assembly engine may also be configured to convert the assembled user generated content into an audio and/or video file, encode the audio and/or video file, and stream the encoded audio and/or video file to the one or more display devices, wherein the one or more display devices are further configured to decode the encoded audio and/or video file. The Client computers/devices 50 (i.e., display devices) may receive at least a user generated content from the assembly engine, or database from the server 60. In some embodiments, the client 50 may render and display the processed and combined content. The Client computers/devices 50 (i.e., display devices) may also receive updates to the processed and combined content from the server 60.

Figure 13:
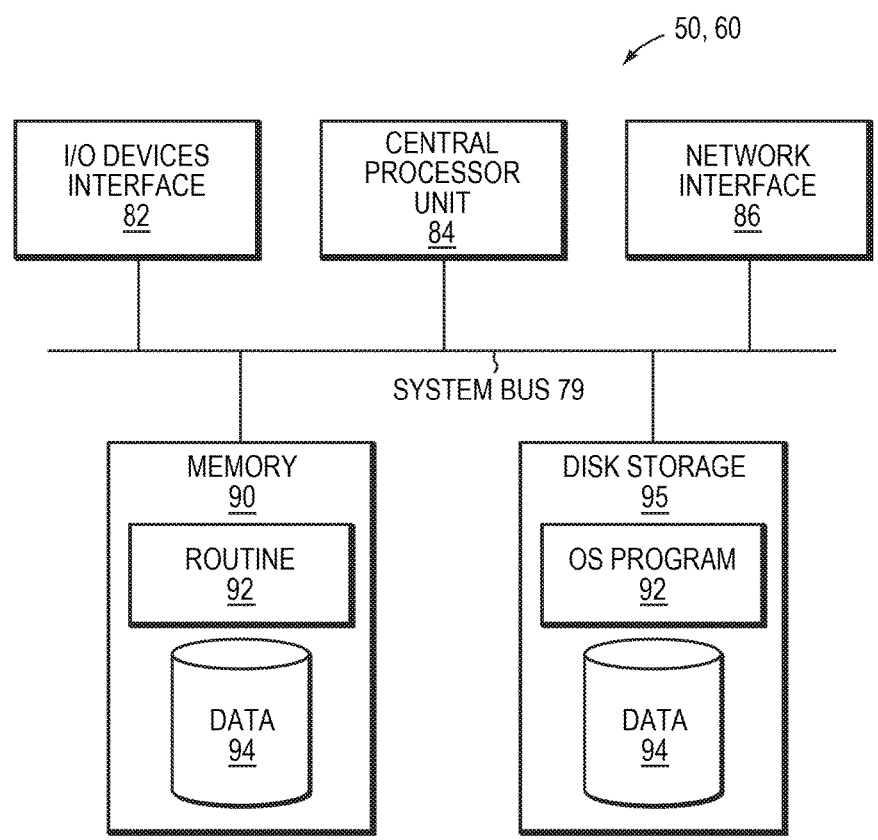
FIG. 13 is a block diagram of the internal structure of a computer in the computer network of FIG. 12.

FIG. 13 is a diagram of an example internal structure of a computer (e.g., client processor/device 50 or server computers 60) in the computer system of FIG. 12. Each computer 50, 60 includes a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 12). Memory 90 provides volatile storage for computer software instructions 92 and data 94 used to implement an embodiment 1000 of the present disclosure (e.g., any of the assembly engine, database elements, content stream building, content stream swapping, and encoding/decoding described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions. In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 may be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 (shown in FIG. 12) embodied on a propagated signal on a propagation medium (e.g., a radio wave, an infrared wave, a laser wave, a sound wave, or an electrical wave propagated over a global network such as the Internet, or other network(s)). Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

According to some embodiments, one advantage is the capability to process and display diverse content simultaneously on display devices and computing devices. Another unique advantage is some embodiments may include a mobile platform. Some embodiments of the method (and system) 1000 may require no central management console and/or application, in order to create organize, and/or manage content distribution and display.

According to some embodiments, another advantage is that some embodiments may use a unique system of channels (including but not limited to communication, electronic, digital, analog, and/or other types of channels) to organize the distribution of content. In some embodiments, the method (and system) may permit multiple users to contribute content to a channel, such that it can be reviewed and approved by an "editor" responsible for content distributed on the channel. As such, some embodiments allow: (1) content to come from virtually anywhere in the organization; (2) distribution of the content according to where in the organization it may be delivered; (3) assurance the content is appropriate for display; (4) rendering of content into a common professional format; and (5) organization of content in such a way that content may be selected and displayed on a display device like how a television channel is selected on a cable enabled television set.

Another advantage is that in some embodiments users with mobile computing devices may utilize unique mobile computing device micro-templates in order to create content that some embodiments may deliver to display devices and other computing devices. According to some embodiments, micro-templates may be specifically designed for use on mobile platforms, such as smartphones, tablets, smartwatches, etc. In some embodiments, micro-templates may take advantage of a mobile computing device's integrated camera, touch screen display, and/or other capabilities. In some embodiments, users may optimize micro-templates to enter content in the form of articles. In some embodiments, the server may assemble multiple articles together into a single playlist that may display on a display device as a continuous content stream, which may include an automatically generated text ticker including headlines.

Another advantage is that some embodiments of the method (and system) 1000 include embedded and automated editorial review. In some embodiments, groups of people with a common interest may interact with, manage, and distribute news and other key organizational messages, as well as the status of their shared activities, using computing devices, including mobile computing devices. Some embodiments may assure submitted user generated content passes through an editorial step, and may be approved by an editor prior to the submitted user generated content's display. The editorial step may assure that the user generated content meets an organization's standards for internal and/or public communications, and/or that the user generated content's alignment with strategic objectives. The editorial step prevents problems inherent in message distribution within an organization that may occur when members of the organization use non-standard communications methods to distribute unapproved and/or factually incorrect messages to the rest of the organization. Unmonitored email and social media based methods may distribute content to the rest of the organization that include inaccuracies, inconsistencies, unprofessional language, or other content that distracts and diverges from a coordinated communications strategy that may assure organizational alignment. In some embodiments, the method (and system) 1000 instead enables organizations to manage and control the high level messages that the organizations may distribute internally and/or externally. In some embodiments, the method (and system) 1000 enables the distribution of messages that properly align an organization, members, employees, and partners around a single set of strategic objectives.

In some embodiments, the server may deliver continuous content streams while permitting dynamic changes to the streaming user generated content to occur. In some embodiments, the server may enable an uninterrupted stream of continuously changing video-like user generated content to display on display devices, while maintaining a continuous connection with a display device displaying content. In some embodiments, the server may use a single Uniform Resource Locator (URL) to display a content stream, and while the display device is displaying the content stream linked to the URL, the user generated content may be modified behind the scenes (e.g., without interruption of the content stream). In some embodiments, the server may swap new or modified user generated content at the appropriate time with the user generated content previously associated with that URL. The swap enables the method (and system) 1000 to change the user generated content linked to a URL without changing the URL or refreshing the display device. As such, according to some embodiments, no human interaction is necessary to maintain the feed even though the user generated content has changes. In some embodiments, the server may transform the behavior and/or data of user generated content by automatically organizing, assembling, and/or combining user generated content. In some embodiments, the server may transform the behavior and/or data of user generated content by accepting user generated content from a variety of independent users and assembling the accepted user generated content into a playlist, which may be transmitted to one or more display devices as a content stream. Some embodiments of the method (and system) may also provide functional improvements in the technology of digital group communications by improving how quickly, easily, and accurately groups communicate in digital mediums.

Some embodiments of the method (and system) also may provide functional improvements to the quality of computers, computer applications, computer program functionality, and/or computer code by providing communication displays with the experience of video and/or audio, without the significant bandwidth requirements of standard streamed video and/or audio. Some embodiments may send user generated content from a Cloud-based server, via the Internet, for reception by a media streaming device (i.e., a media receiver, and/or wireless media receiving stick) in HTML5 format, and not a pure streamed video. While video and/or audio may be part of the user generated content, some embodiments may process text and images using templates, send once, and convert to video and/or audio at the media streaming device. Thus, some embodiments may reduce the total bandwidth required, while giving users an exceptional viewing experience. Some embodiments of the method (and system) also may provide functional improvements to the quality of computers, computer applications, computer program functionality, and/or computer code by providing continuous content streams to display devices even while updating the displayed content.

Some embodiments of the method (and system) solve a technical problem (thereby providing a technical effect) by improving distribution of digital content. Some embodiments solve a technical problem (thereby providing a technical effect) by providing communication displays with the experience of video and/or audio, without the significant bandwidth requirements of standard streamed video and/or audio. Some embodiments solve a technical problem (thereby providing a technical effect) by providing continuous content streams to display devices even while updating the displayed content.

It should be understood that the example embodiments described above may be implemented in many different ways. In some embodiments, the various methods and machines described herein may be implemented by a physical, virtual or hybrid general-purpose computer, or a computer network environment such as the computer network environment 70. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that may be configured to enable a processor to load the software or subsets of instructions thereof. The processor then executes the instructions and may be configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for distributing user generated content from a computing device to one or more display devices, the computer-implemented method comprising:
   communicatively coupling a computing device, a server, and one or more display devices, the one or more display devices including a publicly viewable large screen display device;
   executing a user interface on the computing device, the user interface including a field for accepting user generated content from a user of the computing device, the user interface being executed on plural computing devices communicatively coupled to the server, and the field being configured to accept various user generated content from different computing devices of different users as information sources;
   for each computing device executing the user interface, storing respective user generated content accepted through the executed user interface, said storing the user generated content being on the server in a manner enabling assembling of various stored user generated content, said assembling arranging into display form certain of the stored user generated content and resulting in an assembled user generated content including at least one playlist that orders one or more portions of user generated content into a sequence;
   selecting at least one of the one or more display devices;
   communicating the assembled user generated content including the at least one playlist to the selected one or more display devices, said communicating resulting in a streaming communication between the server and the selected one or more display devices;
   displaying the assembled user generated content in the sequence defined by the at least one playlist, said displaying being on the selected one or more display devices; and
   subsequently modifying the user generated content as stored on the server while preserving the streaming communication of the assembled user generated content between the server and the selected one or more display devices;
   wherein the assembling further includes automatically:
   extracting one or more pieces of content from a plurality of user generated content by incompatible information sources;
   combining the extracted one or more pieces of content together such that a single news broadcast is formed, the single news broadcast form of the combined extracted pieces of content being separate and distinct from the plurality of stored user generated content as accepted through the executed user interface from the incompatible information sources; and
   displaying the single news broadcast on the selected one or more display devices along with displaying the assembled user generated content in the at least one playlist;
   wherein the computing device is at least one of a wireless mobile computing device and a smart device.

2. The computer-implemented method of claim 1, further comprising initializing the one or more display devices by identifying the one or more display devices, the initializing being performed based upon a respective unique identifier for each display device of the one or more display devices, each of the respective unique identifiers being stored on the server.

3. The computer-implemented method of claim 2 wherein the initializing is performed by the computing device.

4. The computer-implemented method of claim 1 further comprising:
   associating the at least one of the one or more display devices and the assembled user generated content including the at least one playlist with at least one location on the server;
   transmitting a first stream of the assembled user generated content including the at least one playlist from the server to the at least one of the one or more display devices;
   updating, at the server, the assembled user generated content including the at least one playlist; and transmitting the updated stream of the assembled user generated content including the at least one playlist from the server to the at least one of the one or more display devices, while preserving the transmission of the first stream.

5. The computer-implemented method of claim 1, further comprising the assembling being performed at the server.

6. The computer-implemented method of claim 1, further comprising the assembling being performed at the one or more display devices.

7. The computer-implemented method of claim 1 wherein each of the one or more display devices are located at a respective remote location.

8. The computer-implemented method of claim 1, further comprising:
converting the assembled user generated content including the at least one playlist into a video file;
encoding the video file;
streaming the encoded video file to the at least one of the one or more display devices; and
decoding the encoded video file at the at least one of the one or more display devices.

9. The computer-implemented method of claim 1, further comprising:
organizing the user generated content into a plurality of channels; and
selecting at least one of one or more channels to display on the at least one of the one or more display devices.

10. The computer-implemented method of claim 9, further comprising filtering the user generated content within one or more of the plurality of channels.

11. A system for distributing content comprising:
a computing device, a server, one or more display devices, and an assembly engine;
wherein:
a network communicatively couples the computing device, the server, the one or more display devices and the assembly engine, and the one or more display devices include a publicly viewable large screen display device;
the computing device is configured to execute a user interface, the user interface including a field for accepting user generated content from a user of the computing device, the user interface being executed on plural computing devices communicatively coupled to the server, and the field being configured to accept various user generated content from different computing devices of different users as information sources;
the server is configured to store from each computing device respective user generated content in a manner enabling assembling of various stored user generated content;
the assembly engine is configured to: (a) assemble the stored user generated content by arranging into display form certain of the user generated content, the assembled user generated content including at least one playlist that orders one or more portions of user generated content into a sequence;
(b) communicate, by streaming communication, the assembled user generated content including the at least one playlist from the server to the one or more display devices;
the one or more display devices being configured to display the assembled user generated content in the sequence defined by the at least one playlist, on at least one of the one or more display devices; and (c) subsequently modify the user generated content as stored by the server while preserving streaming communication of the assembled user generated content between the server and the one or more display devices, and
the assembly engine is further configured to: (i) extract one or more pieces of content from a plurality of server stored user generated content by incompatible information sources, and (ii) combine the extracted one or more pieces of content together to form a single news broadcast, the single news broadcast form of the combined extracted pieces of content being separate and distinct from the plurality of server stored user generated content;
the one or more display devices being further configured to display the single news broadcast along with displaying the assembled user generated content in the at least one playlist; and
wherein the computing device is at least one of a wireless mobile computing device and a smart device.

12. The system of claim 11, wherein in (a) the assembly engine utilizes display templates to assemble, at the one or more display devices, the user generated content including at least one playlist, and for (b) the assembly engine communicates, by streaming communications said user generated content from the server to the one or more display devices for assembly and display.

13. The system of claim 11 wherein the assembly engine is further configured to convert the assembled user generated content into a video file, encode the video file, and stream the encoded video file to the one or more display devices, wherein the one or more display devices are further configured to decode the encoded video file.

14. The system of claim 11 wherein the assembly engine is further configured to organize the user generated content into a plurality of channels and select one or more channels of the plurality of channels to display on the one or more display devices.

15. The system of claim 14, wherein the assembly engine is further configured to filter the user generated content of one or more of the plurality of channels.

16. The system of claim 11 wherein the server is further configured to initialize the one or more display devices by identifying the one or more display devices, each of the one or more display devices having a respective unique identifier, the initialization being performed based upon the respective identifier.

17. A computer-implemented method of distributing user generated content from one or more computing devices to a display device, the computer-implemented method comprising:
communicatively coupling one or more computing devices, a server, and a display device, the display device including a publicly viewable large screen display device;
executing a user interface on the one or more computing devices, the user interface including a field for accepting various user generated content from different computing devices of different users as information sources;
for each computing device executing the user interface, storing respective user generated content accepted through the executed user interface, said storing the user generated content being on the server;
creating one or more channels by filtering certain of the stored user generated content and compiling the filtered user generated content into the one or more channels;

communicating the created one or more channels from the server to the display device, the created one or more channels being persistent and said communicating resulting in streaming communication between the server and the display device;

from the communicated channels, selecting at least one channel of the created one or more channels to display on the display device;

displaying the selected at least one channel on the display device;

subsequently modifying the user generated content as stored on the server while preserving streaming communication of the created one or more channels from the server to the display device, extracting one or more pieces of content from a plurality of stored user generated content by incompatible information sources;

combining the extracted one or more pieces of content together to form a single news broadcast, the single news broadcast form of the combined extracted pieces of content being separate and distinct from the plurality of stored user generated content and displaying the single news broadcast on the display device along with displaying the selected at least one channel;

wherein the one or more computing devices include at least one of: a wireless mobile computing device, a smart device, a tablet, and a laptop.

18. The computer-implemented method of claim 1 wherein the wireless mobile computing device includes a smartphone, and the display device includes a smart television or streaming device-configured television.

19. The computer-implemented method of claim 1 wherein the preserving is based upon the use of hypertext markup language (HTML) in the assembled user generated content.

* * * * *